US012609322B2

(12) United States Patent
Lee et al.

(10) Patent No.: US 12,609,322 B2
(45) Date of Patent: Apr. 21, 2026

(54) BATTERY ACTIVE MATERIAL LAYER WITH CONDUCTIVE ACTIVE MATERIAL PARTICLES

(71) Applicant: LG Energy Solution, Ltd., Seoul (KR)

(72) Inventors: Ki Seok Lee, Daejeon (KR); Nam Jeong Lee, Daejeon (KR); Dong Mok Shin, Daejeon (KR); Eun Ji Jang, Daejeon (KR); Koo Seung Chung, Daejeon (KR); Ho Chan Lee, Daejeon (KR); Yoon Gyeong Jeong, Daejeon (KR); Ho Hyeon Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/228,398

(22) Filed: Jun. 4, 2025

(65) Prior Publication Data

US 2025/0300184 A1 Sep. 25, 2025

Related U.S. Application Data

(63) Continuation of application No. 18/965,976, filed on Dec. 2, 2024.

(30) Foreign Application Priority Data

Dec. 1, 2023 (KR) ........................ 10-2023-0172773

(51) Int. Cl.
*H01M 4/62* (2006.01)
*H01M 4/13* (2010.01)
(Continued)

(52) U.S. Cl.
CPC ........... *H01M 4/623* (2013.01); *H01M 4/131* (2013.01); *H01M 4/366* (2013.01);
(Continued)

(58) Field of Classification Search
None
See application file for complete search history.

(56) References Cited

U.S. PATENT DOCUMENTS

2023/0378441 A1 11/2023 Kim et al.
2023/0387384 A1* 11/2023 Kim ........................ H01M 4/62

FOREIGN PATENT DOCUMENTS

JP 2016081927 5/2016
JP 2018037380 2/2022
(Continued)

OTHER PUBLICATIONS

KR1020240175810—Office Action mailed on Mar. 5, 2025, 14 pages.
PCT/KR2024/019306—International Search Report and Written Opinion mailed on Mar. 12, 2025, 18 pages.

*Primary Examiner* — Barbara L Gilliam
*Assistant Examiner* — Angela J Martin
(74) *Attorney, Agent, or Firm* — K&L Gates LLP

(57) ABSTRACT

A cathode active material layer includes conductive active material particles individually with a core and a coating on a surface of the core, wherein the core comprises a cathode active material, and the coating comprises an electrically conductive material; and a binder including fibers that form a three-dimensionally networked mesh of fibers. The cathode active material layer is free or substantially free of electrically conductive particles other than the conductive active material particles. The conductive active material particles are accommodated in the 3D mesh of the binder, and adjacent ones of the conductive active material particles abut one another within the 3D mesh, in which the electrically conductive material of the coating of one of the conductive active material particles makes at least one contact with the electrically conductive material of the
(Continued)

coating of one or more adjacent ones of the conductive active material particles.

12 Claims, 2 Drawing Sheets

(51) Int. Cl.

| | | |
|---|---|---|
| *H01M 4/131* | (2010.01) | |
| *H01M 4/36* | (2006.01) | |
| *H01M 4/58* | (2010.01) | |
| *H01M 4/587* | (2010.01) | |
| *H01M 10/05* | (2010.01) | |
| *H01M 10/0525* | (2010.01) | |
| *H01M 4/02* | (2006.01) | |

(52) U.S. Cl.

CPC ......... *H01M 4/5825* (2013.01); *H01M 4/587* (2013.01); *H01M 10/0525* (2013.01); *H01M 2004/021* (2013.01)

(56) References Cited

FOREIGN PATENT DOCUMENTS

| KR | 20190035579 | | 4/2019 |
|---|---|---|---|
| KR | 20190038163 | | 4/2019 |
| KR | 20220052852 | | 4/2022 |
| KR | 20220068725 | | 5/2022 |
| KR | 1020220076344 | A | 6/2022 |
| KR | 1020220090461 | A | 6/2022 |
| KR | 1020220093603 | A | 7/2022 |
| KR | 20230022129 | | 2/2023 |
| KR | 1020230149743 | A | 10/2023 |
| KR | 1020230149756 | A | 10/2023 |

* cited by examiner

BATTERY ACTIVE MATERIAL LAYER WITH CONDUCTIVE ACTIVE MATERIAL PARTICLES

CROSS-REFERENCE TO RELATED APPLICATIONS

This application is a continuation of U.S. patent application Ser. No. 18/965,976, filed Dec. 2, 2024, entitled BATTERY ACTIVE MATERIAL LAYER WITH CONDUCTIVE ACTIVE MATERIAL PARTICLES, and claims the priority of Korean Patent Application No. 10-2023-0172773 filed on Dec. 1, 2023, in the Korean Intellectual Property Office, the disclosure of which is incorporated herein by reference.

FIELD

This disclosure relates to an electrode mixture film, an electrode active material layer, a method for preparing the same, a dry electrode and a lithium secondary battery which include the same.

BACKGROUND

Secondary batteries are used in various categories including small-sized products such as digital cameras, P-DVDs, MP3Ps, mobile phones, PDAs, portable game devices, power tools, and E-bikes as well as large-sized products requiring high power such as electric vehicles and hybrid vehicles, power storage devices for storing surplus power or renewable energy, and backup power storage devices.

The secondary batteries are generally manufactured in a way that an electrode active material slurry is applied to a positive electrode (also referred to as "cathode") current collector and a negative electrode (also referred to as "anode") current collector to prepare an electrode active material layer, which is then subjected to drying and rolling to prepare a positive electrode and a negative electrode, and the positive electrode and the negative electrode are stacked on both sides of a separator to form an electrode assembly having a predetermined shape, and then the electrode assembly is accommodated in a battery case, an electrolyte is injected, and the battery case is sealed.

Meanwhile, as a solvent contained in the slurry evaporates in the process of drying the electrode active material slurry, defects, such as pinholes or cracks, may be generated in the electrode active material layer formed on the current collector. In addition, the electrode active material slurry is not dried uniformly at an internal portion and an external portion thereof, and thus a powder floating phenomenon may occur due to a difference in solvent evaporation rate. That is, powder present in a portion dried earlier may float and form a gap from a portion dried relatively later, resulting in degradation of electrode quality.

Therefore, to address the limitations described above, drying devices capable of controlling the evaporation rate of the solvent while allowing the inside and outside of the electrode active material slurry to be uniformly dried have been considered, but these drying devices are very expensive and require considerable cost and time for operation, and thus have poor manufacturing processability.

Meanwhile, the solvent contained in a typical electrode active material slurry is N-methyl-2-pyrrolidone (NMP), which has a high boiling point and thus requires high heat energy and a very long drying furnace to be dried, making it highly unsuitable for mass production. In addition, N-methyl-2-pyrrolidone (NMP) is a toxic substance and is harmful to living things, thereby failing to be environmentally friendly.

Therefore, there has been a recent trend of active research on dry electrodes in which electrodes are manufactured without using solvents. The dry electrode is obtained by laminating a free-standing type electrode mixture film, including an electrode active material, a binder, and a conductive material and prepared in the form of a film, onto a current collector. First, an electrode active material, a carbon material as a conductive material and a fiberized binder are mixed by using a blender, the binder is fiberized by imparting shear force thereto through a process, such as jet milling or kneading, and then the resultant mixture is subjected to calendering to form a film shape, thereby providing a free-standing film.

Meanwhile, in the manufacture of the dry electrode, materials are mixed without solvents and dispersants, and thus a method of dispersing each material to ensure uniform distribution is a key technology, and linear conductive materials such as CNT, which have lately been widely used in wet electrodes and have the effect of reducing an amount of a conductive material, are not dispersed well in the dry process, making it difficult to achieve an increase in active material loading resulting from the reduced amount of conductive material.

Accordingly, the dry electrodes require a relatively greater amount of conductive material than the wet electrodes, and there is a need to develop materials or processes capable of reducing the amount of conductive material.

SUMMARY

One aspect of this disclosure provides a cathode active material layer for a battery that includes conductive active material particles individually with a core and a coating on a surface of the core, wherein the core comprises a cathode active material, and the coating comprises an electrically conductive material; and a binder comprising fibers that are generally linear, extend in random orientations, curve or bend randomly, and intersect and connect with one another at random locations, which provides a three-dimensionally networked mesh of fibers (hereinafter "3D mesh") comprising a number of mesh openings in random shapes, wherein the cathode active material layer is free or substantially free of electrically conductive particles other than the conductive active material particles.

Another aspect of this disclosure provides a cathode active material layer for a battery that includes conductive active material particles individually with a core and a coating on a surface of the core, wherein the core comprises a cathode active material, and the coating comprises an electrically conductive material; and a binder comprising fibers that are generally linear, extend in random orientations, curve or bend randomly, and intersect and connect with one another at random locations, which provides a three-dimensionally networked mesh of fibers (hereinafter "3D mesh") comprising a number of mesh openings in random shapes, wherein the cathode active material layer is free or substantially free of electrically conductive particles other than the conductive active material particles, wherein the conductive active material particles are accommodated in the 3D mesh of the binder, and adjacent ones of the conductive active material particles abut one another within the 3D mesh, in which the electrically conductive material of the coating of one of the conductive active material particles makes at least one contact with the electrically conductive material of the coating of one or more adjacent ones of the conductive active material particles, such that first multiple ones of the fibers ("first multiple fibers") contact a first one of the conductive active material particles ("a first particle") and extend in random orientations on and/or over circumferential areas of the first particle, in which at least some of the first multiple fibers intersect and connect with one another on and/or over some of the circumferential areas of the first particle to form a plurality of mesh openings comprising a first mesh opening that defines a first circumferential area of the first particle, such that second multiple ones of the fibers ("second multiple fibers") contact a second one of the conductive active material particles ("a second particle") and extend in random orientations on and/or over circumferential areas of the second particle that is adjacent to the first particle, in which some of the second multiple fibers intersect and connect with one another on and/or over some of the circumferential areas of the second particle to form a plurality of mesh openings comprising a second mesh opening that defines a second circumferential area of the second particle, such that third multiple ones of the fibers ("third multiple fibers") contact a third one of the conductive active material particles ("a third particle") and extend in random orientations on and/or over circumferential areas of the third particle that is adjacent to the second particle, in which some of the third multiple fibers intersect and connect with one another on and/or over some of the circumferential areas of the third particle to form a plurality of mesh openings comprising a third mesh opening that defines a third circumferential area of the third particle, such that the first particle abuts the second particle in that the first circumferential area of the first particle (directly) contacts the second circumferential area of the second particle without electrically conductive particles intervening therebetween, which provides electrical conductivity between the first particle and the second particle, such that the second particle abuts the third particle in that the second circumferential area of the second particle contacts the third circumferential area of the third particle without electrically conductive particles intervening therebetween, which provides electrical conductivity between the second particle and the third particle, such that the first particle does not abut or contact the third particle, wherein, while being free or substantially free of electrically conductive particles, the cathode active material layer has electrical conductivity with a surface resistance in a range from about 0.01 $\Omega \cdot cm2$ to about 100 $\Omega \cdot cm2$ via contacts made between adjacent ones of the conductive active material particles accommodated in the 3D mesh.

In some embodiments of the cathode active material layer, fourth multiple ones of the fibers ("fourth multiple fibers") contact a fourth one of the conductive active material particles ("a fourth particle") and extend in random orientations on and/or over circumferential areas of the fourth particle that is adjacent to the third particle, in which some of the fourth multiple fibers intersect and connect with one another on and/or over some of the circumferential areas of the fourth particle to form a plurality of mesh openings comprising a fourth mesh opening that defines a fourth circumferential area of the fourth particle; and wherein the third particle abuts the fourth particle in that the third circumferential area of the third particle contacts the fourth circumferential area of the fourth particle without electrically conductive particles intervening therebetween, which provides electrical conductivity between the third particle and the fourth particle.

In some embodiments of the cathode active material layer, the first particle does not abut or contact the fourth particle.

In some embodiments of the cathode active material layer, fifth multiple ones of the fibers ("fifth multiple fibers") may contact a fifth one of the conductive active material particles ("a fifth particle") and extend in random orientations on and/or over circumferential areas of the fifth particle that is adjacent to the fourth particle, in which some of the fifth multiple fibers intersect and connect with one another on and/or over some of the circumferential areas of the fifth particle to form a plurality of mesh openings comprising a fifth mesh opening that defines a fifth circumferential area of the fifth particle; and wherein the fifth particle abuts the sixth particle in that the fifth circumferential area of the fifth particle contacts the sixth circumferential area of the sixth particle without electrically conductive particles intervening therebetween, which provides electrical conductivity between the fifth particle and the sixth particle.

In some embodiments of the cathode active material layer, the first particle does not abut or contact the fifth particle. In some embodiments of the cathode active material layer, the second particle does not abut or contact the fourth or fifth particle.

In some embodiments of the cathode active material layer, the first, second, third, fourth, and fifth particles form a path that extends through the 3D mesh in all three spatial dimensions.

In some embodiments of the cathode active material layer, the conductive active material particles comprise one particle that does not contact any fiber.

In some embodiments of the cathode active material layer, the conductive active material particles comprise one particle that contacts multiple fibers, such that the multiple fibers extend in random orientations on and/or over circumferential areas of the particle and do not intersect and connect with one another to form any mesh opening on or over a circumferential area of the particle.

Another aspect of the present disclosure provides a method for preparing the cathode active material layer as provided herein. The method includes steps of mixing the conductive active material particles and the binder to form a material mixture, kneading the material mixture while applying shear force to form a mixed aggregate, pulverizing the mixed aggregate to prepare mixed powder, and sheeting the mixed powder to prepare the cathode active material layer.

Another aspect of the present disclosure provides a dry electrode that includes a current collector and the cathode active material layer provided herein disposed on the current collector.

Another aspect of the present disclosure provides a lithium secondary battery comprises a plurality of electrodes and separators alternately stacked, wherein at least one of the electrodes comprises the dry electrode as provided herein that includes a current collector and the cathode active material layer provided herein disposed on the current collector.

Another aspect of this disclosure provides an electrode mixture film capable of smoothly forming a conductive path even in circumstances where there is not enough a conductive material and increasing active material loading with reducing an amount of a conductive material.

Another aspect of this disclosure provides a lithium secondary battery that may have improved resistance and lifetime characteristics, and improved capacity characteristics with the use of the electrode mixture film.

[1] According to an aspect of this disclosure, there is provided an electrode mixture film including an electrode active material and a fiberized binder, wherein the electrode active material comprises an active material core and a carbon coating layer disposed on the surface of the core, and wherein a conductive path connectivity index (CPCI) of the electrode mixture film, defined by Equation 1 below, is 0.09 to 0.45.

$$CPCI = AB \times R \times (TC / DAM) \qquad \text{[Equation 1]}$$

In Equation 1 above, wherein in Equation 1 above, AB indicates a degree of agglomeration of the binder in the electrode mixture film, DAM indicates a volume cumulative average particle diameter D50 (μm) of the electrode active material, TC indicates a thickness (μm) of the carbon coating layer of the electrode active material, and R is calculated by [(WAM/WB)×(1+2WC)], where WB indicates a weight percentage (wt %) of the binder to a total weight of the electrode mixture film, WAM indicates a weight percentage (wt %) of the electrode active material to a total weight of the electrode mixture film, WC indicates a dimensionless value representing a weight percentage (wt %) of a conductive material to a total weight of the electrode mixture film.

[2] The present disclosure provides the electrode mixture film according to [1] above, wherein obtaining a target image, having a resolution of 1280×960 or greater, of a cross-section of the mixture film formed through ion milling based on back scattered electron measurement (BSE) using a field emission scanning electron microscope (FESEM), adjusting a contrast level of an active material region of the target image to a highest contrast level and adjusting a contrast level of a binder region of the target image to a lowest contrast level, and dividing into active material pixels and binder pixels belonging to each region, and for the binder pixels, calculating the number of agglomerated binder pixels in an agglomerated binder region having an area of 3 μm2 or greater, which is a binder region formed by a plurality of adjacent binder pixels, and calculating the total number of binder pixels in an entire binder region are performed, and accordingly, the degree of agglomeration AB of the binder may be defined by Equation 2 below.

$$AB = \qquad \text{[Equation 2]}$$

(number of agglomeration binder pixels)/(total number of binder pixels)

[3] The present disclosure provides the electrode mixture film according to [1] or [2] above, wherein the electrode active material may have a volume cumulative average particle diameter D50 of 0.1 μm to 5.0 μm.

[4] The present disclosure provides the electrode mixture film according to any one of [1] to [3] above, wherein the electrode active material may have a ratio of an average thickness TC of the carbon coating layer to the volume cumulative average particle diameter D50 DAM of 0.0002 to 0.1.

[5] The present disclosure provides the electrode mixture film according to any one of [1] to [4] above, wherein the degree of agglomeration AB of the binder may be 0.3 to 0.9.

[6] The present disclosure provides the electrode mixture film according to any one of [1] to [5] above, wherein in Equation 1 above, R may be 16 to 70.

[7] The present disclosure provides the electrode mixture film according to any one of [1] to [6] above, wherein the active material core may include at least one selected from the group consisting of lithium-manganese-based oxide, lithium-nickel-based oxide, lithium-nickel-manganese-based oxide, lithium-nickel-cobalt-based oxide, lithium-manganese-cobalt-based oxide, lithium-nickel-manganese-cobalt-based oxide, lithium-nickel-cobalt-transition metal (M) oxide, and lithium metal phosphate-based compound.

[8] The present disclosure provides the electrode mixture film according to any one of [1] to [8] above, wherein the active material core may include a lithium metal phosphate-based compound represented by Formula 1 below.

$$Li1+aFe1-xMxPO4 \qquad \text{[Formula 1]}$$

In Formula 1 above, Mis at least one selected from Mn, Co, Ni, Al, Mg, and Ti, and a and x satisfy $-0.5 \leq a \leq 0.5$, $0 \leq x < 1$.

[9] The present disclosure provides the electrode mixture film according to any one of [1] to [9] above, wherein the fiberized binder may include polytetrafluoroethylene (PTFE).

[10] The present disclosure provides the electrode mixture film according to any one of [1] to [9] above, wherein the electrode mixture film may include 92 to 99.5 parts by weight of the electrode active material and 0.5 to 8 parts by weight of the fiberized binder and include no conductive material.

[11] The present disclosure provides the electrode mixture film according to any one of [1] to [10] above, wherein the electrode mixture film may have a porosity of 29 vol % or less.

[12] The present disclosure provides the electrode mixture film according to any one of [1] to [11] above, wherein the electrode active material may have a powder resistance of 1 Ωcm to 100 Ωcm.

[13] According to another aspect of this disclosure, there is provided a method for preparing the electrode mixture film, which includes mixing an electrode active material, and a fiberizable binder to form a material mixture (S1), kneading the material mixture while applying shear force to form a mixed aggregate (S2), pulverizing the mixed aggregate to prepare mixed powder (S3), and sheeting the mixed powder to prepare a mixture film (S4).

[14] The present disclosure provides the electrode mixture film according to any one of [1] to [13] above, wherein the step S1 may be performed at a mixing rate of 3,000 rpm to 20,000 rpm for 0.5 to 60 minutes.

[15] The present disclosure provides the electrode mixture film according to any one of [1] to [14] above, wherein step S2 may be performed at a kneading rate of 10 rpm to 100 rpm for 3 to 60 minutes.

[16] The present disclosure provides the electrode mixture film according to [13] to [15] above, wherein the step S3 may be performed in a pulverizing machine at a rate of 1,000 rpm to 15,000 rpm for 5 seconds to 30 minutes.

[17] According to another aspect of this disclosure, there is provided a dry electrode including a current collector and the above-described electrode mixture film disposed on the current collector.

[18] The present disclosure provides the dry electrode according to [17] above, wherein the electrode may be a positive electrode.

[19] According to another aspect of this disclosure, there is provided a lithium secondary battery including a plurality of electrodes, wherein at least one of the electrodes includes the dry electrode described above.

[20] According to another aspect of this disclosure, there is provided an electrical device including the lithium secondary battery described above.

The electrode mixture film according to an aspect of this disclosure, even if a conductive material is insufficient, may have excellent conductive path connectivity by controlling conductivity of an electrode active material itself, contact between active materials, and distribution of a binder, is not dependent on a conductive material for forming a conductive path and thus is free from issues caused by non-uniform distribution of the conductive material, and may increase active material loading.

Furthermore, the electrode mixture film according to an aspect of this disclosure is capable of providing a high-performance electrode that is less affected by a conductive material, and requires no process for dispersing the conductive material during the manufacturing process, and accordingly, may greatly contribute to improving unit price competitiveness by reducing production costs and process costs.

In addition, the lithium secondary battery according to another aspect of this disclosure includes the electrode mixture film and thus have no issues caused by non-uniform distribution of a conductive material, thereby improving resistance and lifetime characteristics of batteries, and may have improved capacity and energy density due to increased loading of an electrode active material.

DETAILED DESCRIPTION

Figure 1:
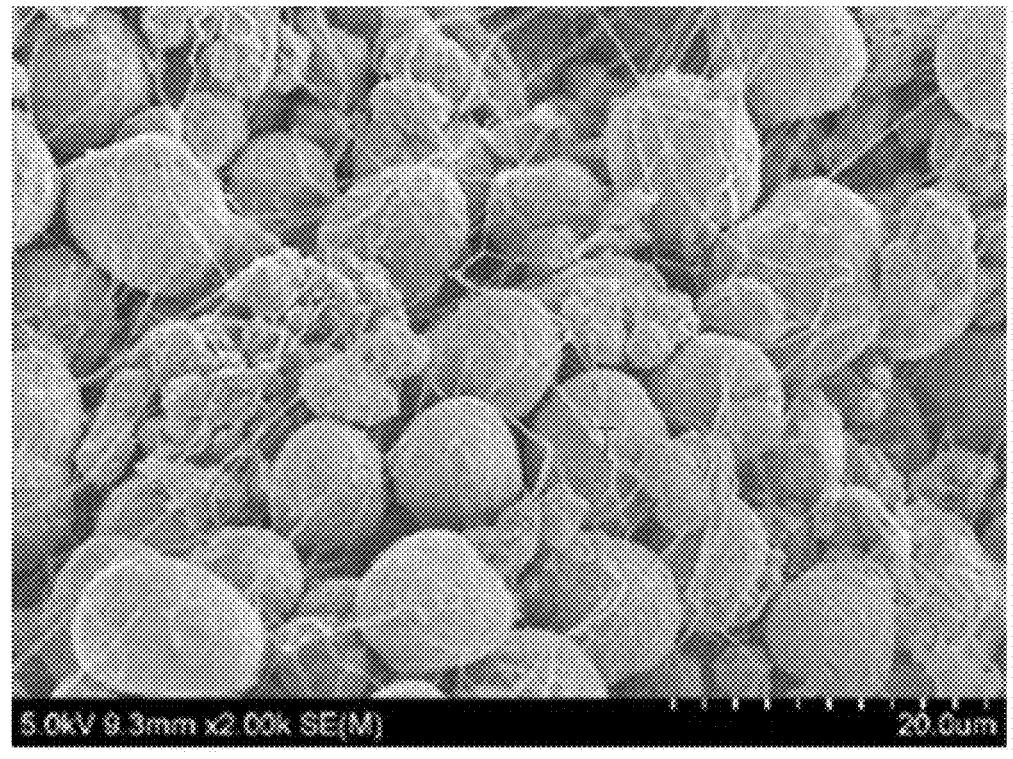
FIG. 1 is an SEM photograph of a portion of an electrode active material layer according to one embodiment.

Hereinafter, the electrode mixture film, the method for preparing the same, the dry electrode and the lithium secondary battery of this disclosure will be described in detail.

It will be understood that words or terms used herein and claims of this disclosure shall not be construed as being limited to having the meaning defined in commonly used dictionaries. It will be further understood that the words or terms should be interpreted as having meanings that are consistent with their meanings in the context of the relevant art and the technical idea of this disclosure, based on the principle that an inventor may properly define the meaning of the words or terms to best explain this disclosure.

The term "volume cumulative average particle diameter $D_{50}$" as used herein may be defined as a particle diameter at a cumulative volume of 50% in a particle size distribution curve of particles. The $D_{50}$ may be measured, for example, by using a laser diffraction method. The laser diffraction method generally allows the measurement of a particle diameter ranging from a submicron level to a few mm and may produce highly repeatable and high-resolution results.

Herein, the term "average particle diameter D50" may be defined as the arithmetic mean value calculated by measuring the particle diameters of at least 30 particles observed in scanning electron microscope (SEM) images at a magnification of 5,000 to 20,000 times. The particle diameter refers to the longest axis of the particle.

Herein, the term "material mixture" indicates a mixture containing an electrode active material and a binder (optionally containing a conductive material), which is physically mixed to form a uniform dispersed phase, and is a product of a mixing process as used herein as a powder mixture, which may be one in which no solvent is substantially involved. In this case, the fact that no solvent is substantially involved indicates that no solvent is added or only a very small amount of solvent is added when mixing the material mixture.

Herein, the term "mixed aggregate" indicates one in which the powder mixture is combined or connected and converted into a dough-like aggregate as the material mixture is affected by shear force and thus a binder is fiberized, and may be a product of a kneading process as used herein with a solid content of 100%.

Herein, the term "electrode powder" may indicate a material in a powder state where the mixed aggregate is pulverized to have a smaller particle size.

Herein, the term "electrode mixture film" may indicate one that is prepared in the form of a free-standing type single sheet using the electrode powder with no involvement of a solvent. Herein, the term 'self-standing type' indicates one capable of maintaining a single form independent from other members and moving or handling by itself. The electrode mixture film may be formed through compression of electrode mixture powder, as will be described later. For example, the mixed powder may be integrated through compression to form a layered structure.

Herein, the term "average thickness of a carbon coating layer" may indicate an average value of the values derived after measuring a thickness of a carbon coating layer at 100 or more points on a surface of an active material using transmission electron microscope (TEM). In this case, when selecting more than 100 points, the points may be selected at appropriate intervals to cover entire particles.

Herein, the term "degree of agglomeration of binder" is a measure that may evaluate the extent to which a binder is dispersed and aggregated in an electrode mixture film, and the degree of agglomeration of a binder may be measured through the following method.

1) (Preparing a target image) an electrode mixture film is cut through ion milling to prepare a cut surface sample, and for the cut surface, a target image having a resolution of 1280×960 or greater is obtained through back scattered electron (BSE) measurement using field emission scanning electron microscope (FESEM, Hitachi, Su8020 and the like may be used).

2) (Adjusting a contrast level) a commercial image processing program (e.g., Mountains) is used to adjust a contrast level from the target image, and a contrast level for the active material region is adjusted to the highest contrast level and a contrast level for the binder region is adjusted to the lowest contrast level, which is then divided into and binder pixels and active material pixels for each pixel in the image.

3) (Calculating percentage of aggregation region) for the binder pixels, the number of agglomerated binder pixels is calculated in an agglomerated binder region having an area of 3 $\mu m^2$ or greater, which is a binder region formed by a plurality of adjacent binder pixels, and the total number of binder pixels in an entire binder region is calculated to derive the degree of agglomeration AB of the binder using Equation 2 below.

$$A_B = \text{[Equation 2]}$$

(number of agglomeration binder pixels)/(total number of binder pixels)

Herein, the term "three-dimensional fibrous network structure" may indicate a structure formed through fibrilization of a binder during the process of forming a sheet from a mixture composition including an electrode active material and a binder into an electrode mixture film. Specifically, the three-dimensional fibrous network structure may refer to various structures where fine fibers formed through the fibrilization of the binder serve as a framework, and thus can function as a support, enabling the electrode mixture film to be a free-standing film. Here, an electrode active material and, optionally, a conductive material may be accommodated within pores formed in the three-dimensional fibrous network structure.

Herein, the "conductive material" may indicate a conductive material present in addition to an electrode active material including an active material core and a carbon coating layer disposed on the core.

That is, the "conductive material" herein may be present separately from the electrode active material within the electrode mixture film.

Herein, an electrode mixture film, a method for preparing the same, a dry electrode, and a lithium secondary battery including the same may each include at least one of the technical features and/or technical configurations described below, and these technical features and/or technical configurations may be combined in various ways.

Electrode Mixture Film

An electrode mixture film according to the present disclosure includes an electrode active material and a fiberized binder, wherein the electrode active material comprises an active material core and a carbon coating layer disposed on the surface of the core, and wherein a conductive path connectivity index (CPCI) of the electrode mixture film, defined by Equation 1 below, may be 0.09 to 0.45.

$$CPCI = A_B \times R \times (T_C / D_{AM}) \qquad \text{[Equation 1]}$$

In Equation 1 above, AB indicates a degree of agglomeration of the binder in the electrode mixture film, $D_{AM}$ indicates a volume cumulative average particle diameter $D_{50}$ (μm) of the electrode active material, $T_C$ indicates a thickness (μm) of the carbon coating layer of the electrode active material, and R may be calculated by $[(W_{AM}/W_B) \times (1 + 2W_C)]$, where $W_B$ indicates a weight percentage (wt %) of the binder to a total weight of the electrode mixture film, $W_{AM}$ indicates a weight percentage (wt %) of the electrode active material to a total weight of the electrode mixture film, $W_C$ indicates a dimensionless value representing weight percentage (wt %) of a conductive material to a total weight of the electrode mixture film.

In general, unlike wet electrodes, dry electrodes are manufactured without using solvents, and thus uniformly dispersing electrode materials is an important and difficult process and has a significant impact on electrode performance. In addition, in order to increase electrode active material loading, a high-performance conductive material may be required to be used to prevent performance degradation along with a reduction in the input amount, but the high-performance conductive material, such as carbon nanotubes, has poor dispersibility. That is, in the manufacture of dry electrodes, there are difficulties in dispersing due to no use of solvents and difficulties in dispersing due to use of materials having poor dispersibility.

However, in the present disclosure, in order to address the difficulty of dispersion due to the characteristics of conductive materials as described above, an electrode mixture film having excellent conductive path connectivity while having an increased loading amount to improve resistance characteristics of batteries by using an active material having low powder resistance, particularly an active material containing a carbon coating layer, instead of using a conductive material or instead of using a conductive material in a minimum amount, is intended to be proposed.

Conductive Path Connectivity Index (CPCI)

According to an aspect of this disclosure, a CPCI of the electrode mixture film, defined by Equation 1 below, may be 0.09 to 0.45.

$$CPCI = A_B \times R \times (T_C / D_{AM}) \qquad \text{[Equation 1]}$$

In Equation 1 above, AB indicates a degree of agglomeration of the binder in the electrode mixture film, $D_{AM}$ indicates a volume cumulative average particle diameter $D_{50}$ (μm) of the electrode active material, $T_C$ indicates a thickness (μm) of the carbon coating layer of the electrode active material, and R may be calculated by $[(W_{AM}/W_B) \times (1 + 2W_C)]$, where $W_B$ indicates a weight percentage (wt %) of the binder to a total weight of the electrodemixture film, $W_{AM}$ indicates a weight percentage (wt %) of the electrode active material to a total weight of the electrode mixture film, $W_C$ indicates a dimensionless value representing a weight percentage (wt %) of a conductive material to a total weight of the electrode mixture film.

The CPCI may be an indicator evaluating how well a conductive path that may increase electron mobility and ion mobility may be formed in the electrode mixture film, and when an electrode mixture film is prepared to satisfy the above range, resistance characteristics of batteries may be improved even with a trace amount or no inclusion of a conductive material.

The CPCI may be defined as a ratio of a content ratio R of an electrode active material and a binder and an average thickness $T_C$ of a carbon coating layer to a volume cumulative average particle diameter $D_{AM}$ of the electrode active material, and the product of the degree of agglomeration $A_B$ of a binder.

Through the degree of agglomeration of a binder, the proportion of binder fiberized in a portion of the binder and aggregated in the electrode mixture film may be determined. In other words, through the level of the aggregation of the binder, a contact area between electrode active materials may be determined when the binder forms a three-dimensional fibrous network structure in the electrode mixture film by the fibrillization.

However, when the binder is excessively aggregated, the diversity of a conductive path may have a more significant effect than securing a contact area between the active material and the trace amount of conductive material accommodated in the pores present in the matrix or between the active materials, and the excessive aggregation of the binder may hinder the formation of a complex challenge path. In addition, mechanical properties of the electrode mixture film are poor, which may lead to degradation in appearance and durability, and thus this may need to be controlled to an appropriate level.

The average particle diameter of the electrode active material may be related to the spacing between pores in the three-dimensional fibrous network structure of the fiberized binder within the electrode mixture film, and thus a smaller particle diameter may result in a larger area in contact between the electrode active material particles or the electrode active material and the trace amount of conductive material particles. That is, this may indicate that more conductive paths may be formed through the contact as the electrode active material includes a carbon coating layer.

In order to form the electrode mixture film which is a free-standing film, from the electrode powder, as the active material particle diameter becomes smaller, an input amount of the binder needs to be increased and in a dry electrode, the binder serving as a key component that forms a support structure of the film, when included in a greater amount within a certain range, may improve durability or processability of a sheet forming process. But, the increase in the amount of the binder may lead to a reduction in a loading amount of the active material and in contact area between electrode active materials, and an increase in resistance, intuitively, the binder, as a resistor, is likely to harm conductivity, and thus the increase in the amount of the binder needs to be limited. Therefore, it is difficult to consider that applying the active material having a small particle diameter is the only way to improve performance.

The degree of agglomeration of the binder may be intuitively interpreted as meaning that the distribution of the binder is uneven, but conversely, an area where the binder is agglomerated may mean a possible presence of an area where the active materials, or the active material and the conductive material are agglomerated. Thus, the greater degree of agglomeration of the binder may lead to the increase in contact area between electrode active materials, thereby forming a conductive path, the smaller particle diameter of the electrode active material may lead to the improvement in contact between active materials in the three-dimensional fibrous network structure. The fact that binders are evenly distributed and thus provide no agglomeration region may be interpreted as meaning that even when the active materials are accommodated in the internal pores, with no active contact between the binders, the formation of a conductive path is hardly achievable, and as meaning that the contact between the active materials, or the active material and the conductive material, may be indirectly determined through the degree of agglomeration of binders.

However, the influence of the degree of agglomeration of the binder may vary according to the input amount of the binder, and when the particle diameter of the electrode active material becomes smaller, the amount of the binder needs to be increased but this may increase resistance independently of the degree of agglomeration. Moreover, the carbon coating layer may be essential but may affect the mobility of lithium ions depending on the thickness. Thus, factors playing a role in securing a conductive path in an electrode mixture film with insufficient a conductive material are identified to define CPCI.

According to an aspect of this disclosure, the electrode mixture film has a CPCI of 0.09 to 0.45. When the CPCI is less than 0.09, the case indicates that the fiberization of the binder is progressed excessively, resulting in a low agglomeration value of the binder, which may lead to poor mechanical properties. In addition, the case indicates that although the electrode active materials are evenly distributed, many no contact portions are present, and thus a number of disconnected portion in the conductive path may be formed and the electrode resistance may be too high when the conductive material is included in a trace amount or not included, and accordingly, the performance of batteries may become very poor. A larger CPCI value could be expected that the conductive path may be formed well, but contrary to these theoretical expectations, when the CPCI value may be greater than 0.45, the degree of agglomeration of the binder may be excessively high, and accordingly, degradation in conductivity may occur due to the failure to form a complex conductive path, and the mechanical properties of the electrode mixture film may be low or appearance defects such as streaks or cracks may be caused on the surface, resulting in poor durability. In addition, the carbon coating layer may be thick relative to the average particle diameter of the electrode active material, and accordingly, poor mobility of lithium ions, relatively low capacity, and short battery life may be caused. That is, when the CPCI value becomes greater, the conductive path may be formed well, but this technical meaning may be satisfied when the CPCI may be 0.45 or less, and when the CPCI may be greater than 0.45, various issues described above may be generated, and thus the CPCI value needs to be controlled.

When the CPCI satisfies the range of 0.09 to 0.45, even with a small amount or no inclusion of a conductive material, the relationship between the distribution of the binder, and the average particle diameter of the electrode active material and the thickness of the carbon coating layer creates a synergistic effect, and accordingly, resistance characteristics of batteries may be improved. The resistance measured in an electrode state may be lower when a conductive material is included, but the resistance value measured upon driving of a battery may be more favorable since the resistance of an electrode evaluates only electron mobility, whereas the resistance of a battery may reflect both electron mobility and ion mobility. Accordingly, the CPCI may preferably be 0.10 or greater, 0.11 or greater, 0.12 or greater, 0.13 or greater, 0.15 or greater, 0.17 or greater, or 0.18 or greater, and may also be 0.43 or less, 0.40 or less, 0.38 or less, 0.36 or less, 0.35 or less, or 0.33 or less.

That is, the ion mobility may be affected by various factors, such as the path through which lithium ions escape from the inside of the active material and the path through which lithium ions travel from the surface of the active material to the outermost surface of the electrode mixture film, and thus the resistance characteristics of batteries are not improved just because the electron movement path is secured by the conductive material, and accordingly, as in this disclosure, an electrode mixture film capable of improving resistance characteristics without containing a conductive material may be provided.

According to an aspect of this disclosure, the electrode active material may have an average particle diameter $D_{50}$ of 0.1 μm to 5.0 μm, specifically 0.5 μm to 4.0 μm, more specifically 0.7 μm to 3.5 μm. When the average particle diameter of the electrode active material is excessively large, degradation in capacity of batteries may be caused, degradation in high-rate charging/discharging characteristics may be caused from high internal resistance and reduced ion movement speed, and physical contact between active materials inside the fiberized binder matrix may not be allowed, failing to form a conductive path. In addition, when the average particle diameter of the electrode active material is excessively small, when manufacturing an electrode mixture film containing the electrode active material, mechanical strength, such as tensile strength and elongation at break, of the electrode mixture film may be reduced.

Accordingly, when the average particle diameter $D_{50}$ of the electrode active material satisfies the above range, the particle diameter of the obtained mixture powder may be uniform and an appropriate specific surface area of the electrode active material particles may be obtained, and thus capacity characteristics, electrical conductivity, and high-rate charging/discharging characteristics of batteries may be improved. In addition, when preparing the electrode mixture film, it may be easy to form a film, and mechanical properties such as tensile strength and elongation at break may be improved.

In addition, according to an aspect of the present disclosure, a carbon coating layer of the electrode active material may have an average thickness of 1 nm to 30 nm. Preferably, the average thickness may be 2 nm or greater, or 3 nm or greater, and may also be 25 nm or less, 20 nm or less, 15 nm or less, or 10 nm or less. When the thickness of the carbon coating layer satisfies the above range, it contributes to satisfying the CPCI value and accordingly, conductive path connectivity may be improved without loss of capacity. In this case, the average thickness may indicate a value obtained by measuring the thickness of the carbon coating layer at least 100 points on the surface of the electrode active material particles using transmission electron microscope and averaging the measured values.

Furthermore, according to one aspect, a ratio of the average thickness (μm) of the carbon coating layer to the volume cumulative average particle diameter (μm) of the electrode active material may be 0.0002 to 0.1, and preferably, the ratio may be 0.0004 or greater, 0.0006 or greater, or 0.0008 or greater, and may also be 0.08 or less, 0.06 or less, 0.05 or less, 0.03 or less, or 0.01 or less. An electrode active material may be prepared or selected to satisfy the above ratio. Prior to satisfying the respective ranges of the volume cumulative average particle diameter and average thickness of the carbon coating layer described above, the ratio of the thickness of the carbon coating layer to the total electrode active material needs to be determined, and this may play a major role in influencing CPCI, thereby contributing to improving battery performance.

According to an aspect of the present disclosure, among factors defining the CPCI, the degree of agglomeration of the binder may be 0.3 to 0.9, preferably 0.35 or greater, 0.40 or greater, or 0.50 or greater, and may also be 0.88 or less, 0.87 or less, 0.85 or less, 0.83 or less, or 0.80 or less. The degree of agglomeration of the binder can be determined during the process of manufacturing the electrode mixture film, for example, by mixing the electrode active material and the binder, applying shear force through kneading, and forming the electrode powder into a sheet via roll pressing. The fibrillation of the binder during these steps affects the degree of agglomeration of the binder. By appropriately controlling the mixing conditions, kneading conditions, and sheet-forming conditions, the desired degree of agglomeration of the binder can be achieved.

When the degree of agglomeration of the binder is within the above range, it may indicate that the degree of fibrillization of the binder is appropriate in forming the electrode mixture film, and may indicate that the spacing of the fiberized binder matrix is appropriately configured to enable physical contact between the conductively coated electrode active materials.

The degree of agglomeration of the binder may be measured through the following method.

1) (Preparing a target image) an electrode mixture film is cut through ion milling to prepare a cut surface sample, and for the cut surface, a target image having a resolution of 1280×960 or greater may be obtained through back scattered electron (BSE) measurement using field emission scanning electron microscope (FESEM, Hitachi, Su8020 and the like may be used).

2) (Adjusting a contrast level) a commercial image processing program (e.g., Mountains) may be used to adjust a contrast level from the target image, and a contrast level for the active material region may be adjusted to the highest contrast level and a contrast level for the binder region may be adjusted to the lowest contrast level, which is then divided into and binder pixels and active material pixels for each pixel in the image.

3) (Calculating percentage of aggregation region) for the binder pixels, the number of agglomerated binder pixels is calculated in an agglomerated binder region having an area of 3 μm$^2$ or greater, which is a binder region formed by a plurality of adjacent binder pixels, and the total number of binder pixels in an entire binder region is calculated to derive the degree of agglomeration $A_B$ of the binder using Equation 2 below.

$$[\text{Equation 2}]$$

$$A_B = $$

(number of agglomeration binder pixels)/(total number of binder pixels)

As described above, the degree of agglomeration of the binder may be calculated through a series of processes including preparing a target image, adjusting the contrast level in the prepared image through an image program, and calculating the ratio of the agglomeration region, and in this case, when calculating the ratio of the agglomeration region, the standard for determining the agglomeration region may be 3 μm$^2$ or greater. However, when a region smaller than 3 μm$^2$ is included as an agglomeration region, the effect of contact with respect to active materials may not be accurately reflected, and thus the standard may be best defined as described above. In addition, when the fiberization progresses normally and a sheet is formed normally, an excessively large agglomeration region may not be present. However, when a long width of the agglomeration region, i.e., a longest width within the region, is greater than 10 μm, this may be considered as a manufacturing defect of an electrode.

According to an aspect of this disclosure, an amount ratio of the electrode active material and the fiberized binder included as a factor in the CPCI may be considered. For example, in the CPCI, the amount of the electrode active material and the amount of the binder may be reflected as R, and specifically, based on the total weight of the electrode mixture film, R may be defined as a ratio of a weight percentage (wt %) of the electrode active material to a weight percentage (wt %) of the binder.

For example, R may be 16 to 70, 17 to 66, and in another example, may be 19 or greater, 21 or greater, or 24 or greater, and may also be 60 or less, 50 or less, or 47 or less. When R satisfies the above range, it may contribute to improving energy density by maximizing a loading amount and also satisfying the CPCI by maximizing the degree of agglomeration of the binder and the contact area between active materials and diversifying and complexifying conductive pathways.

The R can be calculated by $[(W_{AM}/W_B)\times(1+2W_C)]$. Normally, a conductive material may greatly contribute to forming a conductive path, may be not well dispersed, and may indicate that the CPCI value may be changed according to the input amount of the conductive material relative to the input amount of the electrode active material or binder.

For example, the conductive material serves as an auxiliary agent capable of improving resistance by contributing to the migration of charges, but the conductive material, when not evenly distributed throughout while filling pores in an electrode, may inhibit the mobility of lithium ions and thus, when a general input amount is applied, it may be considered that the amount may not contribute to improving overall resistance properties.

Meanwhile, according to an aspect of this disclosure, the electrode active material may be included in an amount of 90 parts by weight to 99 parts by weight, preferably 91 parts by weight or more, 92 parts by weight or more, 93 parts by weight or more, 94 parts by weight or more, or 95 parts by weight or more, and may be included in an amount of 98.5 parts by weight or less, 98 parts by weight or less, or 97.5 parts by weight or less, with respect to the total weight of 100 parts by weight of the electrode mixture film. When the electrode active material is included in the above range, it may be desirable both in terms of increasing capacity and energy density of an electrode and in terms of optimizing the function of the conductive material and the binder as auxiliary materials, and this may be a value directly reflected in R as a weight percentage.

The fiberized binder may be included in an amount of 0.5 parts by weight to 8.0 parts by weight, preferably, 1.0 parts by weight or more, 1.3 parts by weight or more, 1.5 parts by weight or more, 1.7 parts by weight or more, or 2.0 parts by weight or more, and may also be included in an amount of 7.0 parts by weight or less, 6.5 parts by weight or less, 6.0 parts by weight or less, 5.5 parts by weight or less, or 5.0 parts by weight or less, with respect to the total weight of 100 parts by weight of the electrode mixture film. When the fiberized binder may be included in an amount in the above range, the issue of increased resistance or the undesired degree of fibrillization for manufacturing into a sheet may not be caused, and this may be a value directly reflected in R as a weight percentage.

According to an aspect of this disclosure, the electrode mixture film includes a trace amount of or no conductive material, and may specifically include the conductive material in an amount of 0.8 parts by weight, 0.7 parts by weight, 0.5 parts by weight, 0.3 parts by weight, 0.1 parts by weight, 0.05 parts by weight, or 0.01 parts by weight and may more preferably include no conductive material. Even in a case where the conductive material is added at $1/10$ or even $1/100$ of the general input amount, or not added, when the relationship between the degree of agglomeration of the binder, and the thickness and average particle diameter of the carbon coating layer of the electrode active material, and appropriate values thereof are controlled as described above, an electrode mixture film having excellent conductive path connectivity may be obtained. Ultimately, the resistance characteristics of batteries may be improved, and the capacity with an increase in loading amount may also be increased.

Electrode Active Material

According to an aspect of this disclosure, the electrode active material is not particularly limited as long as it is a commonly used electrode active material, and for example, the electrode active material may be a positive electrode (also referred to as "cathode") active material or a negative electrode (also referred to as "anode") active material, and includes a carbon coating layer on a surface of an active material core.

According to an aspect of this disclosure, an electrode mixture film includes an electrode active material containing a carbon coating layer, and a fiberized binder.

The positive electrode active material is a compound capable of reversibly intercalating and deintercalating lithium, and may include a lithium transition metal compound containing at least one selected from the group consisting of nickel (Ni), cobalt (Co), manganese (Mn), and iron (Fe).

Specifically, the positive electrode active material may include a lithium oxide containing lithium and one or more types of metals such as cobalt, manganese, nickel, and aluminum. More specifically, the lithium metal oxide may be lithium-manganese-based oxide (e.g., $LiMnO_2$, $LiMn_2O_4$, and the like), lithium-cobalt-based oxide (e.g., $LiCoO_2$ and the like), lithium-nickel-based oxide (e.g., $LiNiO_2$ and the like), lithium-nickel-manganese-based oxide (e.g., $LiNi_{1-Y}Mn_YO_2$ (where $0<Y<1$), $LiMn_{2-Z}Ni_ZO_4$ (where $0<Z<2$), and the like), lithium-nickel-cobalt-based oxide (e.g., $LiNi_{1-Y1}Co_{Y1}O_2$ (where $0<Y1<1$ and the like), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), and the like), lithium-nickel-manganese-cobalt-based oxide (e.g., $Li(Ni_pCo_qMn_r)O_2$ (where $0<p<1$, $0<q<1$, $0<r<1$, and $p+q+r=1$) or $Li(Ni_{p1}Co_{q1}Mn_{r1})O_4$ (where $0<p1<2$, $0<q1<2$, $0<r1<2$, and $p1+q1+r1=2$), and the like), or lithium-nickel-cobalt-transition metal (M) oxide (e.g., $Li(Ni_{p2}Co_{q2}Mn_{r2}M_{s2})O_2$ (where M may be selected from the group consisting of Al, Fe, V, Cr, Ti, Ta, Mg, and Mo, and p2, q2, r2, and s2 are each an atomic fraction of independent elements, wherein $0<p2<1$, $0<q2<1$, $0<r2<1$, $0<s2<1$, and $p2+q2+r2+s2=1$ are satisfied), and the like, and any one thereof or a compound of two or more thereof may be included.

In particular, in terms of improving capacity and stability of a battery, the lithium metal oxide may be $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), lithium nickel cobalt aluminum oxide (e.g., $Li(Ni_{0.8}Co_{0.15}Al_{0.05})O_2$ and the like), or lithium nickel manganese cobalt aluminum oxide (e.g., $Li(Ni_{0.86}Co_{0.05}Mn_{0.07}Al_{0.02})O_2$), lithium iron phosphate (e.g., $LiFePO_4$), and the like, and any one thereof or a compound of two or more thereof may be included.

In addition, the positive electrode active material may include a lithium metal phosphate-based compound containing iron, and specifically may be lithium iron phosphate, and may be represented by, for example, Formula 1 below.

$$Li_{1+a}Fe_{1-x}M_xPO_4 \qquad \text{[Formula 1]}$$

In Formula 1 above, M is at least one selected from Mn, Co, Ni, Al, Mg, and Ti, and a and x satisfy $-0.5 \leq a \leq 0.5$, $0 \leq x < 1$.

When the positive electrode active material is a lithium metal phosphate-based compound, particularly lithium iron phosphate, the positive electrode active material whose safety is guaranteed has a relatively smaller capacity than lithium nickel-based oxide. However, according to an aspect of the present disclosure, a dry electrode providing high loading may be achievable, and thus a lithium secondary battery having lithium iron phosphate exhibiting improved safety and improved capacity applied and even providing superior unit price competitiveness is achievable.

The negative electrode active material may include at least one selected from the group consisting of lithium metal, a carbon material capable of reversibly intercalating/deintercalating lithium ions, metals or alloys of lithium and these metals, a metal composite oxide, a material which may be doped and undoped with lithium, and a transition metal oxide.

As the carbon material capable of reversibly intercalating/deintercalating lithium ions, any carbon material may be used without particular limitation so long as it may be a carbon-based negative electrode active material generally used in a lithium ion secondary battery, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature fired carbon) or hard carbon, mesophase pitch carbide, and fired cokes.

As the metals or alloys of lithium, metals selected from the group consisting of Cu, Ni, Na, K, Rb, Cs, Fr, Be, Mg, Ca, Sr, Si, Sb, Pb, In, Zn, Ba, Ra, Ge, Al, and Sn or alloys of lithium and these metals may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me:Mn, Fe, Pb, or Ge; Me':Al, boron (B), P, Si, Groups I, II, and III elements of the periodic table, or halogen; $0 < x \leq 1$; $1 \leq y \leq 3$; $1 < z \leq 8$) may be used as the metal complex oxide.

The material, which may be doped and undoped with lithium, may include Si, $SiO_x$ ($0 < x \leq 2$), a Si—Y alloy (where Y may be an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y may be an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium-containing titanium composite oxide (LTO), vanadium oxide, and lithium vanadium oxide.

According to an aspect of this disclosure, the electrode active material including the carbon coating layer may preferably be a positive electrode active material, and the positive electrode active material may include a lithium phosphate-based material. The lithium phosphate-based material has a relatively smaller volume cumulative average particle diameter than other positive electrode active materials, and powder resistance which may be easily reduced using carbon coating, and may thus be optimized to satisfy the CPCI value.

In addition, the electrode active material may have a powder resistance of 1 Ωcm to 100 Ωcm, preferably 2 Ωcm or greater, or 3 Ωcm or greater, and a powder resistance of 90 Ωcm or less, 80 Ωcm or less, or 70 Ωcm or less. The powder resistance may indicate that the active material may be highly conductive, and the electrode active material included in the electrode mixture film of the present disclosure including no conductive material may preferably have a powder resistance in the above-described range. In this case, the powder resistance may be measured by placing 2 g of active material powder in a ceramic container having a diameter of 22 mm with a four-point probe built into the bottom and pressing the powder with a force of 2000 kgf, that is, approximately 50 MPa to measure resistance, using a commercial powder resistivity meter (e.g., HPRM-AM2-L from Hantech), and multiplying a thickness of the pressed active material powder.

Fiberized Binder

According to an aspect of this disclosure, the fiberized binder may be applied as long as a binder is fiberized, and the fibrillization refers to finely dividing high molecular weight polymers which may be commercially available. For example, the fibrillization may be performed using mechanical shear force, and the like, and the fiberized polymer fibers are disintegrated on their surfaces to generate a plurality of microfibers (fibrils), and thus the three-dimensional fibrous network structure may be formed. The fiberized binder may preferably include at least one selected from the group consisting of polytetrafluoroethylene (PTFE) and polyolefin, more preferably include polytetrafluoroethylene (PTFE), and even more preferably may be polytetrafluoroethylene (PTFE). Specifically, the polytetrafluoroethylene (PTFE) may be included in an amount of 60 wt % or greater with respect to a total binder weight. In this case, the binder may further include one or more of polyethylene oxide (PEO), polyvinylidene fluoride (PVdF), polyvinylidene fluoride-cohexafluoropropylene (PVdF-HFP), and polyolefin-based binder.

Conductive Material

According to an aspect of the present disclosure, conductive material is not particularly limited as long as it has conductivity without causing chemical changes in batteries, and for example, a conductive material, such as: carbon black such as acetylene black, Ketjen black, channel black, furnace black, lamp black, or thermal black; fluorinated carbon powder; graphite materials such as natural graphite with a well-developed crystal structure, or artificial graphite; fibrous carbon materials such as carbon fiber, carbon nanotube, or carbon nanofiber; metal fibers; conductive powder such as aluminum powder or nickel powder; conductive whiskers such as potassium titanate; conductive metal oxides such as titanium oxide; conductive polymers such as polyphenylene derivatives, may be used.

Preferably, graphite materials, carbon black, and carbon nanotubes (CNTs) may be applied to achieve uniform mixing of the conductive material and to improve conductivity.

According to an aspect of this disclosure, the electrode mixture film may have a porosity of 17 vol % to 30 vol %, preferably 19 vol % or greater, or 20 vol % or greater, and also a porosity of 29 vol % or less, 27 vol % or less, or 26 vol % or less. When the above range is satisfied, electrolyte impregnation may be excellent, and accordingly, lifetime and output characteristics may be improved and energy density may be excellent.

Porosity may be calculated using Equation A below.

[Equation A]

$$\text{Porosity } (vol \ \%) = \{1 - (\text{electrode density}/\text{true density})\} \times 100$$

In Equation 1 above, the true density is the density of an electrode mixture film measured when the electrode mixture film is taken to a predetermined size and pressed with press equipment until changes in thickness of the film stop, and the electrode density is the density of an electrode mixture film measured when the film is taken to a predetermined size.

Method for Preparing Electrode Mixture Film

A method for preparing the electrode mixture film according to this disclosure includes mixing an electrode active material, a fiberizable binder, and optionally a conductive material, and to form a material mixture (S1); kneading the material mixture while applying shear force to form a mixed aggregate (S2); pulverizing the mixed aggregate to prepare mixed powder (S3); and sheeting the mixed powder to prepare a mixture film (S4).

The description of the electrode active material and the fiberizable binder (same as fiberized binder) is the same as the above, and thus detailed description will not be provided, and preparation processes for each step will be described below.

Step S1

According to an aspect of this disclosure, in the method for preparing the electrode mixture film, the step S1 involves mixing an electrode active material, a conductive material, and a fiberizable binder to form a material mixture. In this case, the mixing is performed such that the electrode active material, the conductive material, and the fiberizable binder are uniformly distributed, and the components are mixed in powder form, and thus the mixing is not limited and may be performed through various methods as long as simple mixing is allowed. However, the present disclosure may be manufactured as a dry electrode with no use of a solvent, and thus the mixing may be performed through dry mixing, and the materials may be added to a device such as a mixer or a blender and mixed.

The mixing may be performed in a mixer at 3,000 rpm to 20,000 rpm, and preferably at 5,000 rpm to 15,000 rpm. When the mixing may be performed within the above range, the materials may be uniformly mixed, thereby improving battery performance. For example, the mixing rate may be 5,500 rpm or greater, 6,000 rpm or greater, or 6,500 rpm or greater, and may also be 14,000 rpm or less, 13,000 rpm or less, or 12,000 rpm or less. The mixing may be performed at the same mixing speed as described above in the mixer, but may be performed for 0.5 to 60 minutes, preferably for 1 to 30 minutes, 1 to 20 minutes, or 1 to 10 minutes.

When the mixing process may be controlled to satisfy the above range, the degree of agglomeration of the binder may be affected and thus the degree of agglomeration may be provided at an appropriate level, and an increase in resistance caused from interference with contact between electrode active materials when the degree of agglomeration may be too low, or a durability issue caused from low mechanical strength of the mixture film when the degree of agglomeration may be too high may be prevented, and thus the mixing process may be preferably controlled within the range described above, and accordingly, an electrode mixture film satisfying CPCI may be obtained.

Step S2

According to an aspect of this disclosure, in the method for preparing the electrode mixture film, the step S2 includes applying shear force to the material mixture obtained in the mixing of step S1 to form a mixed aggregate. That is, the step S2 may be a fibrillization process for fiberizing a fiberizable binder.

The fibrillization process may be performed, for example, through mechanical milling or kneading, and may be not particularly limited as long as the process is generally performed, but may preferably be performed through high temperature-low shear kneading, and may be performed, for example, through a kneader such as a twin-screw extruder. Through this kneading, the fiberizable binder may be fiberized, and accordingly, an electrode active material and conductive material powders are combined or connected to form a mixed aggregate with a solid content of 100%.

The kneading may be performed at a rate of 10 rpm to 100 rpm, and preferably may be performed at a rate of 20 rpm or greater, 30 rpm or greater, 40 rpm or greater, or 45 rpm or greater, and a rate of 80 rpm or less, 70 rpm or less, or 60 rpm or less. In addition, the kneading may be performed for 3 to 60 minutes, and preferably for 4 minutes or greater, or 5 minutes or greater, and also for 40 minutes or less, 30 minutes or less, 25 minutes or less, or 20 minutes or less. When the above range may be satisfied, the fibrillization may be appropriately performed and thus battery characteristics may be improved.

Furthermore, an amount of the material mixture added upon the kneading may also be controlled. For example, the material mixture discharged from the mixing process may be added in an amount of 50 to 150 parts by volume, may preferably be added in an amount of 60 to 140 parts by volume, and may be added in an amount of 70 parts by volume to 130 parts by volume or in an amount of 80 parts by volume to 120 parts by volume, with respect to an internal volume of a kneading device such as a kneader. Accordingly, the fibrillization of the binder may be controlled by controlling the amount of the material mixture added upon kneading, and this, by adjusting conditions of the kneading process together, may control the extent to which a binder network structure formed according to the degree of fibrillization of the binder affects a contact area between active materials, and the degree of agglomeration of the binder.

In addition, the kneading may be performed at high temperature and normal pressure or higher, and specifically, may be performed at pressure higher than normal pressure. For example, the kneading may be performed at 50° C. to 230° C., preferably at 90° C. to 200° C., more preferably 100° C. or higher, 110° C. or higher, or 120° C. or higher, and also, 180° C. or lower, 170° C. or lower, or 160° C. or lower. When the kneading may be performed at a high temperature in the above range, fibrillization of the binder and lump formation through kneading may be well performed, and breakage of the binder subjected to fibrillization may be appropriately prevented.

The kneading may be performed at normal pressure or higher, specifically at a pressure of 1 atm to 3 atm, more preferably at a pressure of 1.1 atm to 3 atm. When the kneading may be performed within the above range, breakage of the binder subjected to fibrillization may be appropriately prevented, and an aggregate may be prevented from having an excessively high density.

According to an aspect of the present disclosure, when a high temperature-low shear kneading process may be performed at high temperature and normal pressure or higher instead of high shear kneading, the effect intended by the present disclosure may be achieved.

By controlling the conditions of the kneading in the S2 step, the three-dimensional fibrous network structure can be formed within the mixed aggregate through the shear force applied to the binder. Since the degree of formation of this structure may influence the degree of agglomeration the binder, these conditions may be adjusted as described above.

Step S3

According to an aspect of this disclosure, in the method for preparing the electrode mixture film, the step S3 includes pulverizing the mixed aggregate prepared through kneading to obtain an electrode powder.

The mixed aggregate prepared through the kneading may be directly pressed and molded into a sheet (sheeting such as calendering process), but in this case, the aggregate may be pressed at strong pressure and high temperature to form a thin film, and accordingly, the film may have an excessively high density or a uniform film may be not obtainable. Therefore, the mixed aggregate prepared as above may be pulverized to manufacture an electrode powder.

An instrument used for the pulverization is not particularly limited, but the pulverization may preferably be performed using an instrument such as a blender or grinder.

The pulverizing may be performed at a rate of 1,000 rpm to 15,000 rpm for 5 seconds to 30 minutes, preferably at a rate of 3,000 rpm to 8,000 rpm for 30 seconds to 15 minutes. When the pulverizing may be performed within the above range, sufficient pulverization may be achieved to prepare powder of an appropriate size for forming a film, and a large amount of fine powder may not be generated in the aggregate.

The pulverizing process described above serves to help properly forming a free-standing film in a subsequent sheet forming process, and may also influence all factors affecting CPCI according to the degree thereof. Accordingly, it may be desirable to control the process to satisfy the conditions described above.

The electrode powder may have an average particle diameter of 10 μm to 3,000 μm, preferably 50 μm to 1,500 μm, more preferably 100 μm to 700 μm. When the above range may be satisfied, an electrode mixture film having uniform thickness and density may be formed, and excellent electrode mixture film physical properties may be obtained.

The electrode powder according to an aspect of this disclosure may, although not essential, further include fillers to suppress expansion of the electrode. The filler is not particularly limited as long as it is a fibrous material without causing chemical changes in batteries, and may be at least one selected from, for example, olefin-based polymers such as polyethylene and polypropylene; fibrous materials such as glass fiber and carbon fiber.

Step S4

According to an aspect of this disclosure, in the method for preparing the electrode mixture film, the step S4 includes thermocompressing the electrode powder.

The step S4 may be a process of preparing an electrode mixture film in the form of a free-standing sheet by thermocompressing the electrode powder obtained as described above using rolling roll in a roll-to-roll process (calendering process, sheeting process) including two or more pairs of rolling rolls.

The roll-to-roll process (calendering process) may include a roll press unit, the roll press unit may be a pair of rolling rolls arranged to face each other, and a plurality of such rolling roll pairs may be arranged in succession in the roll press unit. When the plurality of rolling rolls are arranged in succession, temperature and tip speed ratio (rotating speed ratio of a pair of rolls) of each roll may be the same or different.

In addition, the temperature of the rolling roll may be 60° C. to 120° C., preferably 70° C. to 100° C., and the rotating speed ratio of the rolling roll may be each independently adjusted appropriately within 1:1 to 1:10. In addition, the prepared electrode mixture film may be put back into the roll press unit and thermocompressed 1 to 10 times to be adjusted to have an appropriate thickness.

The sheet-forming in the step S4 may involve shaping the electrode powder into a film under heat and pressure applied by rolling rolls in a roll-to-roll process. During this process, the binder may undergo additional shear force, further promoting fibrilization, and enabling the three-dimensional fibrous network structures within each powder particle to assemble with one another. The formation and assembly of these structures may influence the degree of agglomeration of the binder, making it possible to control the conditions as described above.

Electrode Active Material Layer

Figure 2:
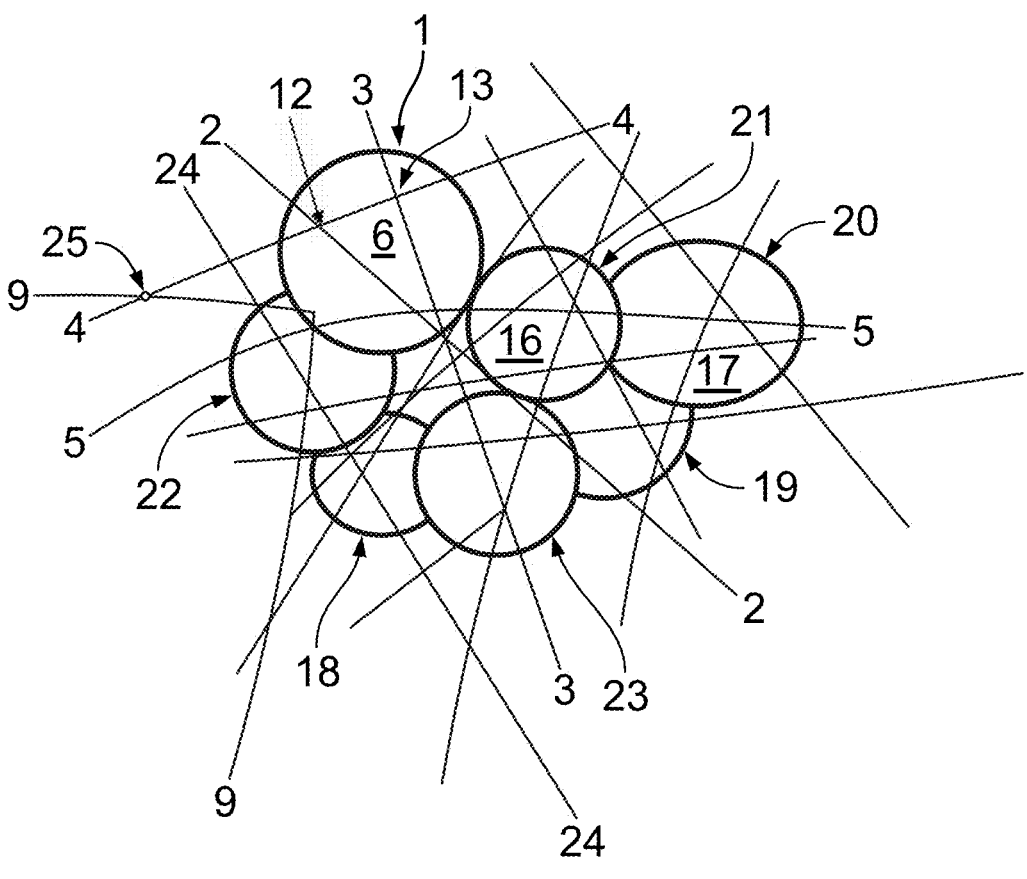
FIG. 2 is a 2-dimension illustration of a portion of an electrode active material layer according to one embodiment.

One aspect of the present disclosure provides an electrode active material layer. The electrode active material layer may be a cathode electrode (also referred to as "positive electrode") active material layer for a battery. The electrode active material layer includes conductive active material particles and a binder comprising fibers. FIG. 1 is an SEM photograph of a portion of an electrode active material layer according to an embodiment. FIG. 2 illustrates a portion of an electrode active material layer as the one shown in FIG. 1.

Particles and Fibers

In FIGS. 1 and 2, the generally round shaped circles 1, 18, 19, 20, 21, 22, and 23, whole or partial, represent particles in the example electrode material layer. These particles are conductive active material particles and will be explained in more detail later. The lines are fibers of the binder in the example electrode active material layer and also will be discussed in more detail later.

2-Dimensional Illustration

FIG. 2 is a 2-dimensional depiction of the example electrode active material layer, and it should be understood that the electrode active material layer has a three-dimensional structure. FIG. 2 only shows the 2-dimensional view of the particles and fibers; and it should be understood that the fibers may extend into and/or out of the 2-dimensional plane of the figure, and the figure shows a top view of the particles at the 2-dimensional plane of the figure. Further, in the "empty" space around the particles in the figure and above and below the 2-dimensional plane of the figure, there may be other particles (not shown), and there may be other fibers on the 2-dimensional plane of the figure that may change direction, bend, and/or curve to the 3-dimensional space above and/or below the 2-dimensional plane of the figure. The term "and/or" used in the context of "X and/or Y" should be interpreted as "X," "Y," or "X and Y."

Partially Shown Particles and Fibers

Referring to FIG. 2, for example, portions of particle 19 is positioned below or behind particles 20 and 21, and portions of particle 18 is positioned below particles 22 and 23. Thus, only part of particles 18 and 19 are shown in FIG. 2. The fibers also are present and extend in all three dimensions of the electrode active material layer and form a three-dimensional network throughout the electrode active material layer, which is not shown in FIG. 2 and is explained in more detail later.

Binder in the Form of Fibers

The electrode active material layer includes a binder in the form of fibers as shown in FIGS. 1 and 2. The fibers may be generally linear and extend in random orientations. They may be arranged without a consistent pattern, direction, or alignment. These fibers may appear as individual threads or strands stretching in different directions. For example, fibers 2, 3, 4, and 5 each extend or stretch in different directions. The overall distribution can create a chaotic or tangled effect, where the fibers may cross over, under, or next to one another without any obvious alignment or organization.

Fibers Extend in Random Directions and Bend or Curve Randomly

As shown in FIG. 2, fibers 2, 3, 4, and 5 each extend in different directions and bend or curve randomly. For example, fibers 2 and 3 each extend generally vertically but at different angles. Fibers 4 and 5 each extend generally horizontally but also at different angles. There is no particular relationship between the directions at which these fibers extend. A fiber may curve or bend along or on a part of the surface of a particle. For example, fiber 5 bends as it extends over particle 1. Fiber 9 sharply bends and changes direction on the surface of particle 1. Other fibers also extend, curve, and/or bend randomly at different directions and/or positions. There is no regularity as to how the fibers extend, curve, and/or bend or the direction or position thereof.

Fibers Crossing and Intersecting

The fibers in FIG. 2 cross over at different, random points. However, the fibers crossing over each other do not necessarily intersect and/or connect at the cross-over points shown in FIG. 2. Some fibers crossing over each other may intersect and/or connect at the cross-over points, and some other may cross over each other but do not intersect or connect at the cross-over points. For example, fibers 2 and 4 cross over, intersect, and connect at point 12 on the surface of particle 1. Similarly, fibers 3 and 4 cross over, intersect, and connect at point 13 on the surface of particle 1; fibers 2 and 5 cross over, intersect, and connect on the surface of particle 1; and fibers 3 and 5 cross over, intersect, and connect on the surface of particle 1. In contrast, fiber 24 crosses over with fibers 4 and 9 but does not intersect or connect with fibers 4 and 9, and instead, fiber 24 is above the plane in which fibers 4 and 9 are positioned. As another example, although FIG. 2 shows fiber 4 crosses over fiber 9 at point 25, these fibers do not intersect or connect at point 25.

Mesh Openings Defining Circumferential Areas on Particles

While fibers 2, 3, 4, and 5 cross over, intersect, and connect with each other on the surface of particle 1 as described above, these fibers form a mesh opening 6, which defines a circumferential area on the surface of particle 1 within mesh opening 6. There may be similarly another particle on top of particle 1 above the 2-dimensional plane of FIG. 2. Some fibers cross over, intersect, and connect with each other on the surface of this particle similarly to fibers 2, 3, 4, and 5 to form a mesh opening that defines a circumferential area on the surface of that particle, and this mesh opening or circumferential area directly contacts mesh opening 6 or the circumferential area defined by mesh opening 6 on the surface of particle 1, without any other particle or fiber in between these contacting mesh openings or circumferential areas. It should be understood that there may be more than two particles that directly contact each other as described herein. In the meantime, there are particles that do not directly contact each other. For example, particle 1 directly contacts particle 21, but does not directly contact particle 19.

Fibers Forming Irregularly Shaped and Connected Network of Webs

As illustrated in FIG. 2, the fibers may overlap at various angles, leading to a web-like or netted appearance. Although FIG. 2 shows only a portion of the electrode active material layer, the fibers cross over or under randomly and form a web. The fibers may curve or bend randomly. The fibers may not follow a consistent or straight path. Instead, each fiber may have unpredictable changes in direction, creating a complex, irregular pattern. For example, fibers 2 and 4 cross over on the surface of particle 1. Similarly, fiber 3 and 4 cross over, fiber 2 and 5 cross over, fibers 3 and 5 cross over on the surface of particle 1. Fiber 5 bends as it extends over particle 1. Fiber 9 sharply bends and changes direction on the surface of particle 1. The fibers may also twist, loop, or arc at various angles, rather than aligning in a single, uniform orientation. Each fiber may shift in a unique way, creating a network that lacks clear order. For example, one fiber may gradually bend into a gentle arc, while another fiber may twist sharply in a different direction. This randomness creates a disordered structure where the fibers may overlap or separate at different points, giving the overall structure a tangled, chaotic, or web-like appearance. For example, the fibers in FIG. 2 create such a chaotic web. This randomness can affect the properties of the binder comprising these fibers. For example, such random bending and curving can enhance flexibility, create more porous or breathable structure, and potentially increase resilience by distributing stress more evenly across various fibers.

Three-Dimensionally Networked Mesh

As discussed, the fibers may intersect and connect with one another at random locations in the electrode active material layer. The fibers may cross paths and make contact in an irregular, unpredictable pattern. For example, fibers 2 and 4 intersect and connect at point 12, and fibers 3 and 4 intersect and connect at point 13. This lack of uniformity result in a complex, intertwined network where intersections and connections do not follow any specific grid or alignment. Specifically, each fiber might intersect another at various angles, forming crossing points throughout the structure. Some intersections could happen at sharp angles, almost perpendicular, while others might meet at gentler, more oblique angles. These connection points can be close together in some areas, creating densely packed clusters, while in other regions, intersections may be more spread out, leading to an open, airy structure. This random intersection pattern creates a network that is inherently non-linear and flexible, allowing it to adapt to stress or pressure from multiple directions. Such random intersections thus enhance durability, provide porosity, and allow for grater flexibility, as the fibers support each other at various points throughout the structure. The intersected and connected fibers provide a three-dimensionally networked mesh of fibers (hereinafter "3D mesh"). The fibers extend in all three spatial dimensions length, width, and height-creating a volumetric, rather than flat, arrangement.

Mesh Openings—Shape, Size, etc.

The 3D mesh includes spaces or gaps between the fibers, namely mesh openings, in random shapes. These mesh openings are formed by the way the fibers intersect and connect as described herein, creating the three-dimensional network with holes or apertures. These mesh openings may not have uniform, regular, or geometric shapes like square, rectangles, or circles. Instead, these mesh openings may vary in size, shape, and orientation in an unpredictable manner, creating an irregular pattern across the entire 3D mesh of the fibers. For example, the shapes can range from asymmetrical polygons to more jagged forms. These openings may appear in different sizes throughout the mesh, with some being wide and others narrow, and they may be spaced unevenly. For example, fibers 2, 3, 4, and 5 form mesh opening 6, which has an asymmetrical polygon shape. There are other mesh openings, such as 16 and 17, which have different shapes and are spaced from mesh opening 6 unevenly. This random arrangement of openings creates a more complex, unpredictable network, and this could increase the strength of or flexibility of the electrode active material layer.

Conductive Active Material Particles

As mentioned above, the electrode active material layer provided herein includes conductive active material particles. The particles shown in FIG. 2 are non-limiting examples of the conductive active material particles, and particle 1 is one of them. There are more particles conductive active material particles in the example electrode active material layer, which are not shown in the figure. The conductive active material particles individually have a core that comprises an electrode active material, such as a cathode (also referred to as "positive electrode") active material. The cathode active material may be any suitable material as provided in paragraphs [0123] to [0128] of the present disclosure.

Coating On or Over Core

Figure 3:
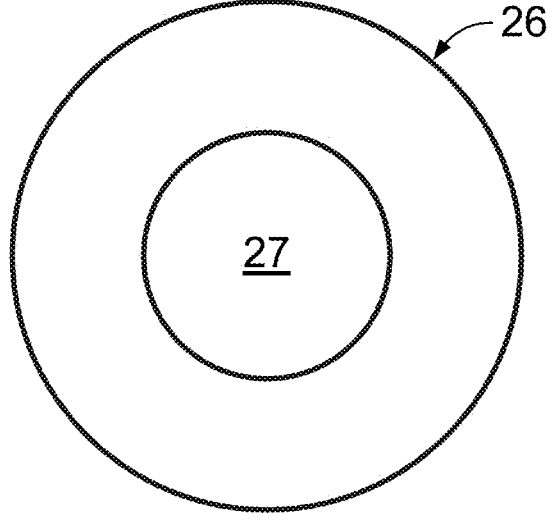
FIG. 3 illustrates a cross-section of a conductive active material particle according to one embodiment.

The conductive active material particles individually also have a coating on or over the surface of the core. All or part of the particles shown in FIG. 2 individually have a coating on or over the surface of a core, which are not shown illustrated there. FIG. 2 shows parts of the outmost surfaces of the coatings of these particles. FIG. 3 illustrates a cross-section of a conductive active material particle that includes a coating 26 on the core 27 according to some embodiments. According to other embodiments, there may be an intervening layer between the coating and the core. When there is no intervening layer between the coating and the core, as in FIG. 3, the coating is on the outermost layer of the core of the particle, directly contacting with or positioning at the outermost layer of the core and situated directly atop of along the exterior layer of the core, rather than delving deeper or going beneath the outermost layer of the core. When there is an intervening layer between the coating and the core, the coating is positioned over the surface of the core, directly contacting with or positioning at the outmost surface of the intervening layer. The intervening layer may include one or more sub-layers of same or different materials.

Electrically Conductive Coating

The coating comprises an electrically conductive material. The electrically conductive material may comprise a carbon-based material selected from the group consisting of carbon black, graphene, carbon nanotubes, amorphous carbon, hard carbon, soft carbon, and mixtures thereof.

Thickness of Coating

The coating may have a thickness in a range of from about 100 nm to 20 μm, such as at or about 100, 200, 300, 400, 500, 600, 700, 800, 900 nm, 1, 2, 3, 4, 5, 6, 7, 8, 9, 10, 11, 12, 13, 14, 15, 16, 17, 18, 19, or 20 μm. In embodiments, the thickness of the coating can be within a range formed by selecting any two numbers listed above. For example, the thickness is in the range of from about 200 nm to about 19 μm, from about 400 nm to about 15 μm, from about 5 μm to about 16 μm, from about 9 μm to about 12 μm, from about 10 μm to about 11 μm, etc.

Substantially Free of Electrically Conductive Particles

The electrode active material layer, such as the cathode active material layer in some embodiments, is free or substantially free of electrically conductive particles other than the conductive active material particles provided herein. "Substantially free" as used herein means that a material contains little to no amount of a specified substance or element and implies that the presence of the substance is minimal to the point of being negligible and does not affect the overall properties or function of the material in a significant way. Here, the electrode active material layer contains little to no amount of electrically conductive particles other than the conductive active material particles, and the presence of electrically conductive particles other than the conductive active material particles is minimal to the point of being negligible. In case the electrode active material layer contains electrically conductive particles such as carbon particles, the amount of the electrically conductive particles is substantially free, which is about 0.000001, 0.000005, 0.00001, 0.00005, 0.0001, 0.0005, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, or 0.2 wt % with regard to the weight of the electrode active material layer. In embodiments, the amount of the electrically conductive particles such as carbon particles is more than 0.00 wt % and less than any amount listed in the immediately previous sentence. For example, the amount of the electrically conductive particles is less than about 0.0005 wt %, less than about 0.001 wt %, less than about 0.005 wt %, or less than about 0.01 wt %. In embodiments, the amount of the electrically conductive particles such as carbon particles can be within a range formed by selecting any two numbers listed in the immediately previous sentence. For example, the electrode active material layer is between about 0.000001 wt % and about 0.001 wt %, between about 0.0001 w % and about 0.01 wt %, or between about 0.001 wt % and about 0.1 wt %.

Conductive Active Material Particles in 3D Mesh

The conductive active material particles are accommodated in the 3D mesh of the binder. Individual conductive active material particles are contained, distributed, or held within the structure of the 3D mesh of the fibers. The particles are physically trapped or confined within the 3D mesh's network. The fibers and the voids in the 3D mesh allow the particles to stay in place without passing through the voids, effectively creating a scaffold that holds the particles in specific locations. The 3D mesh's structure can prevent the particles from moving freely, keeping them contained even if the entire mesh is shifted or flexed. The 3D mesh can hold the particles throughout its entire volume, not just on the surface. The 3D mesh provides structural support to the particles, keeping them in place and stable.

Adjacent Conductive Active Material Particles

In embodiments, adjacent conductive active material particles may abut or contact one another within the 3D mesh. In these adjacent conductive active material particles, two adjacent ones form a contact without any intervening particle or fiber in between these particles at the contacting point. For example, when a first conductive active material particle and a second conductive active material particle about and contact at a point, the contact point on the first particle may be within a first surface area of the first particle that is defined by multiple fibers passing over or on the first particle. Likewise, the contact point on the second particle may be within a second surface area of the second particle that is defined by multiple fibers passing over or on the particle. This way, the electrically conductive material of the coating of one of the conductive active material particles makes at least one contact with the electrically conductive material of the coating of one or more adjacent ones of the conductive active material particles. The neighboring conductive active material particles are positioned so closely together that they touch or press against each other within the 3D mesh, such that the electrically conductive material of the coating of one of the conductive active material particles contacts the electrically conductive material of the coating of one or more of other adjacent ones of the conductive active material particles that directly contact this one conductive active material particle at one or more points on the surface of this particle.

Fibers Contacting Conductive Active Material Particle

In the 3D mesh of the fibers of the binder, multiple fibers may contact a conductive active material particle and extend in random orientations on and/or over circumferential areas, namely, the outer boundary or periphery of the particle. These fibers are positions around the outer surface or near the edge or circumference of the particle, in direct contact with the outer surface or slightly raised above the outer surface of the particle, in an unpredictable, muti-directional arrangement. Each of these fibers may stretch out in its own unique direction, without a consistent alignment or pattern, and these fibers may be distributed at varying angles, creating a disordered, muti-directional layout.

Mesh Opening Defining Circumferential Area of Particle

At least some of these fibers intersect and connect with one another on and/or over some of the circumferential areas of the particle to form a plurality of mesh openings. The plurality of mesh openings include a mesh opening, such as mesh opening 6, which defines a circumferential area of the particle, such as circumferential area 6' of particle 1. At least some of these fibers are positions around the particle's outer surface, either in direct contact with or slightly raised above the particle's surface, in a way that the fibers cross each other, forming multiple small, open spaces, namely, mesh openings. Such fibers are arranged so that they touch and cross over each other at different points around the particle, and these intersections create points of contact where the fibers are linked together. The mesh openings, the spaces left between the fibers, can vary in size and shape based on how the fibers intersect and connect and exist throughout the whole 3D mesh in all three spatial dimensions. The formed plurality of mesh openings may include a mesh opening that defines a circumferential area of the particle. This one mesh opening essentially wraps around the particle, such that this mesh opening conforms to the shape of at least part of the outer surface of the particle.

Directly Contacting Particles

Such mesh openings wrapping about the adjacent particles that directly contact each other may directly contact each other. In other words, the circumferential areas defined by such mesh openings on these particles may directly contact each other. These two particles physically touch each other at the circumferential areas on their surfaces defined by these mesh openings, and there is no intervening material, such as another particle or fiber between these contacting circumferential areas of these particles.

Conductive Path Formed by Directly Contacting Particles

There can be adjacent conductive active material particles held within the 3D mesh that directly contact one another, as described above, in series to form a conductive path due to such direct contacts in series. These particles are in physical contact in a sequential arrangement, one after another, forming a linear, chain-like connection. The conductive coating of each particle directly touches that of the next particle in a continuous sequence, which forms a conductive path through the contacts of these particles, from the first one to the last one in such sequential arrangement. The linear, chain-like connection, although continuous, may extend in all three spatial dimensions of the 3D mesh. This conductive path formed by such chain-like connection of these conductive active material particles may move through the three-dimensional space of the 3D mesh, rather than being confined to a flat plane. Here, any single conductive active material particle may form multiple contacts with its adjacent conductive active material particles, and for any single conductive material particle, there can be multiple linear, chain-like connections. In some other instances, the linear, chain-like connection may also extend on a 2-dimensional flat plane forming a conductive path thereon. Such a conductive path allows electrons to move along the path, providing electric conductivity. If the conductive active material particles are porous, this conductive path also allows ions, such as lithium ions, to move along it, providing ion diffusivity. The 3D mesh of the binder fibers holds these particles in pace, facilitating and stabilizing the contacts between these particles.

Illustration of Conductive Path

Such sequential arrangement of these directly contacting conductive active material particles and formation of the conductive path are illustrated further by the following example fibers and particles.

Examples of Multiple Fibers

The fibers in the 3D mesh of the binder may include, for example, first, second, third, fourth, fifth, sixth, seventh, or others of such multiple fibers as described herein. Here, the "first," "second," "third," "fourth," "fifth," "sixth," and "seventh" are not limited to any particular fibers in the 3D mesh and are used to refer to and differentiate different fibers that have the features described in the examples below.

First Multiple Fibers and First Particle

For example, first multiple ones of the fibers ("first multiple fibers") may contact a first one of the conductive active material particles ("a first particle") and extend in random orientations on and/or over circumferential areas of the first particle, in which at least some of the first multiple fibers intersect and connect with one another on and/or over some of the circumferential areas of the first particle to form a plurality of mesh openings comprising a first mesh opening that defines a first circumferential area of the first particle.

Second Multiple Fibers and Second Particle

Second multiple ones of the fibers ("second multiple fibers") may contact a second one of the conductive active material particles ("a second particle") and extend in random orientations on and/or over circumferential areas of the second particle that is adjacent to the first particle, in which some of the second multiple fibers intersect and connect with one another on and/or over some of the circumferential areas of the second particle to form a plurality of mesh openings comprising a second mesh opening that defines a second circumferential area of the second particle.

Third Multiple Fibers and Third Particle

Third multiple ones of the fibers ("third multiple fibers") may contact a third one of the conductive active material particles ("a third particle") and extend in random orientations on and/or over circumferential areas of the third particle that is adjacent to the second particle, in which some of the third multiple fibers intersect and connect with one another on and/or over some of the circumferential areas of the third particle to form a plurality of mesh openings comprising a third mesh opening that defines a third circumferential area of the third particle.

Fourth Multiple Fibers and Fourth Particle

Fourth multiple ones of the fibers ("fourth multiple fibers") may contact a fourth one of the conductive active material particles ("a fourth particle") and extend in random orientations on and/or over circumferential areas of the fourth particle that is adjacent to the third particle, in which some of the fourth multiple fibers intersect and connect with one another on and/or over some of the circumferential areas of the fourth particle to form a plurality of mesh openings comprising a fourth mesh opening that defines a fourth circumferential area of the fourth particle.

Fifth Multiple Fibers and Fifth Particle

Fifth multiple ones of the fibers ("fifth multiple fibers") may contact a fifth one of the conductive active material particles ("a fifth particle") and extend in random orientations on and/or over circumferential areas of the fifth particle that is adjacent to the fourth particle, in which some of the fifth multiple fibers intersect and connect with one another on and/or over some of the circumferential areas of the fifth particle to form a plurality of mesh openings comprising a fifth mesh opening that defines a fifth circumferential area of the fifth particle.

Sixth Multiple Fibers and Sixth Particle

Sixth multiple ones of the fibers ("sixth multiple fibers") may contact a sixth one of the conductive active material particles ("a sixth particle") and extend in random orientations on and/or over circumferential areas of the sixth particle that is adjacent to the fifth particle, in which some of the sixth multiple fibers intersect and connect with one another on and/or over some of the circumferential areas of the sixth particle to form a plurality of mesh openings comprising a sixth mesh opening that defines a sixth circumferential area of the sixth particle.

Seventh Multiple Fibers and Seventh Particle

Seventh multiple ones of the fibers ("seventh multiple fibers") may contact a seventh one of the conductive active material particles ("a seventh particle") and extend in random orientations on and/or over circumferential areas of the seventh particle that is adjacent to the sixth particle, in which some of the seventh multiple fibers intersect and connect with one another on and/or over some of the circumferential areas of the seventh particle to form a plurality of mesh openings comprising a seventh mesh opening that defines a seventh circumferential area of the seventh particle.

Direct Contact of First and Second Particles

The first particle abuts the second particle in that the first circumferential area of the first particle directly contacts the second circumferential area of the second particle without space between the contact points on the surface of the first particle and on the surface of the second particles, or between the first circumferential area of the first particle and the second circumferential area of the second particle. There is no electrically conductive particle intervening between the first circumferential area of the first particle and the second circumferential area of the second particle. This direct contact of the first and second particles provides electrical conductivity between the first particle and the second particle.

Direct Contact of Second and Third Particles

Likewise, the second particle abuts the third particle in that the second circumferential area of the second particle contacts the third circumferential area of the third particle without electrically conductive particles intervening therebetween, which provides electrical conductivity between the second particle and the third particle.

Direct Contact of Third and Fourth Particles

Likewise, the third particle abuts the fourth particle in that the third circumferential area of the third particle contacts the fourth circumferential area of the fourth particle without electrically conductive particles intervening therebetween, which provides electrical conductivity between the third particle and the fourth particle.

Direct Contact of Fourth and Fifth Particles

Likewise, the fourth particle abuts the fifth particle in that the fourth circumferential area of the fourth particle contacts the fifth circumferential area of the fifth particle without electrically conductive particles intervening therebetween, which provides electrical conductivity between the fourth particle and the fifth particle.

Direct Contact of Fifth and Sixth Particles

Likewise, the fifth particle abuts the sixth particle in that the fifth circumferential area of the fifth particle contacts the sixth circumferential area of the sixth particle without electrically conductive particles intervening therebetween, which provides electrical conductivity between the fifth particle and the sixth particle.

Direct Contact of Sixth and Seventh Particles

Likewise, the sixth particle abuts the seventh particle in that the sixth circumferential area of the sixth particle contacts the seventh circumferential area of the seventh particle without electrically conductive particles intervening therebetween, which provides electrical conductivity between the sixth particle and the seventh particle.

Other Particles

Other particles may similarly abut one another, providing electrical and/or ion conductivity between abutting particles.

Sequential Arrangement of Contacting Particles

However, the first particle may not abut or contact the third, fourth, fifth, sixth, or seventh particle. The second particle may not abut or contact the fourth, fifth, sixth, or seventh particle. The third particle may not abut or contact the first, fifth, sixth, or seventh particle. The fourth particle may not abut or contact the first, second, sixth or seventh particle. The fifth particle may not abut or contact the first, second, third, or seventh particle.

The sixth particle may not abut or contact the first, second, third, or fifth particle. Therefore, the first, second, third, fourth, and fifth particles only directly contact one another sequentially and form a linear, chain-like path. This linear, chain-like path is not limited to a 2D flat plan and can extend through any spatial direction.

Other Multiple Fibers and Particles

Similarly, there may be eighth, ninth, tenth, and others of such multiple fibers and particles as described herein throughout the electrode active material layer. Similarly, "eighth," "ninth," and "tenth" here are not limited to any particular fibers or particles and are used to refer to fibers that have similar features of the "first," "second," "third," "fourth," "fifth," "sixth," or "seventh" fibers as described above and particles that in the same sequential arrangement as the "first," "second," "third," "fourth," "fifth," "sixth," and "seventh" particles as described above. "Others" means numbers other than "first," "second," "third," "fourth," "fifth," "sixth," "seventh," "eighth," "ninth," and "tenth." However, in some embodiments, or in some conductive paths, there may be fewer groups of multiple fibers or particles than four, five, six, seven, eight, nine, or ten. Some conductive path may only have three abutting conductive active material particles. Some conductive path may only have four abutting conductive active material particles. Some conductive path may only have five abutting conductive active material particles. Some conductive path may only have six abutting conductive active material particles. Some conductive path may only have seven abutting conductive active material particles. Some conductive path may only have eight abutting conductive active material particles. Some conductive path may only have nine abutting conductive active material particles. Some conductive path may have more than ten abutting conductive active material particles.

Complexity of Conductive Path

The first, second, third, fourth, fifth, sixth, seventh conductive active material particles, and maybe eighth, ninth, tenth, and others of such conductive active material particles that abut one another as described herein form an electrically conductive path, which allows for electron and/or ion transport along this path in the electrode active material layer. As mentioned above, this conductive path can be on a 2-dimensional flat plan and can extend in all three spatial dimensions of the 3D mesh. This path may loop, spiral, bend, and/or curve as it moves through space. Thus, this path can be simple and can be complex depending on how it moves through the 3D mesh. The complexity of this electron and/or ion transport pathway is measured by tortuosity of the electrode active material layer.

Tortuosity Generally

Tortuosity, generally, is a measure of the complexity of "twistedness" of a transport pathway in a porous medium. It qualifies how much longer a particle, such as an ion or electron, must travel through a structure, such as a porous structure, compared to a straight-line distance between two points.

Tortuosity in Battery

In the context of electrode active materials in batteries, tortuosity refers to the complexity of the electron or ion transport pathways within the structure of the electrode, which plays a significant role in determining the performance, efficiency, and rate capability of the battery.

Mathematical Calculation of Tortuosity

Mathematically, tortursity ($\tau$) is defined as:

$$\tau = L_{actual} / L_{straight}$$

where $L_{actual}$ is the actual path length of transport through the medium, and $L_{straight}$ is the straight-line distance between the two points.

Values of Tortuosity

Tortuosity is always $\geq 1$, with $\tau = 1$ representing a perfectly straight path. Higher tortuosity values indicate more convoluted pathways. Tortuosity affects the effective diffusivity and conductivity of the medium, for example, the electrode active material layer in the context of batteries. A high tortuosity reduces the efficiency of transport process, as it increases the resistance to flow or diffusion of the ion or electron in the context of electrode active material in batteries.

Effects of Fibers on Tortuosity

Here, the 3D mesh of the fibers in the binder facilitates the contacts of the conductive active material particles and potentially reduces the complexity of the electron and ion transport pathways in the electrode active material layer. For example, as described herein, the electrically conductive path or the electron transport pathway formed by the first, second, third, fourth, fifth, sixth, and seventh particles allows the electrons to move from the first particle to the second particle, the third particle, the fourth particle, the fifth particle, the sixth particle, and the seventh particle consecutively via a relatively simple path rather than more convoluted or complex paths. When the conductive active material particles are porous particles, the contacts between the first, second, third, fourth, fifth, sixth, and seventh particles as described herein facilitated by the 3D mesh of the binder fibers allow the lithium ions to transport through the pathway formed by these particles easily. Such relatively simple electron or ion transport paths formed by at least some of the conductive active material particles as described herein reduces the tortuosity of the electrode active material layer provided herein and thus improves the efficiency of the electron or ion transport in the electrode, which directly influences the energy density, power density, and cycling performance of a battery using such an electrode.

Particles Not Surrounded by Fibers

On the other hand, there may be conductive active material particles that are not surrounded by the fibers of the binder. For example, some particles may not contact any fiber. Some particles may contact some fibers, but the fibers contacting such a particle may merely extend in random orientations on and/or over circumferential areas of such a particle and may not intersect and connect with one another to form any mesh opening on or over a circumferential area of such a particle.

Electrical Conductivity of Electrode Active Material Layer

The electrode active material layer provided herein, while being free or substantially free of electrically conductive particles, has electrical conductivity with a surface resistance in a range from about 0.01 $\Omega \cdot cm^2$ to about 100 $\Omega \cdot cm^2$ via contacts made between adjacent ones of the conductive active material particles accommodated in the 3D mesh as described herein.

Electrical Conductivity of Cathode Active Material Layer

In some embodiments, while being free or substantially free of electrically conductive particles, the cathode active material layer has electrical conductivity with a surface resistance in a range from about 0.01 $\Omega \cdot cm^2$ to about 100 $\Omega \cdot cm^2$ via contacts made between adjacent ones of the conductive cathode active material particles accommodated in the 3D mesh as described herein.

Surface Resistance

"Surface resistance" refers to the resistance to the flow of electric current along the surface of a material. High surface resistance in electrodes can hinder charge transfer and reduce battery efficiency. Here, the fibers of the binder facilitate the contacts between adjacent conductive active material particles accommodated in the 3D mesh of the fibers as described herein, forming electrically conductive pathways throughout the electrode active material layer, which effectively reduces the surface resistance of the electrode and thus improves the efficiency of the battery using such an electrode.

Method for Preparing Electrode Active Material Layer

A method for preparing the electrode active material layer according to this disclosure is similar to the method for preparing the electrode mixture film as described above. It includes mixing the conductive active material particles and the binder comprising fibers, namely fibrillizable binder, as described above, to form a material mixture (S1), kneading the material mixture while applying shear force to form a mixed aggregate (S2), pulverizing the mixed aggregate to prepare mixed powder (S3), and sheeting the mixed powder to prepare a mixture film (S4). The descriptions of the conductive active material particles and the binder are the same as the above, and thus detailed descriptions are provided again, and the preparation processes for each step is similarly to those in the method for preparing the electrode mixture film as described above, except that the conductive active material particles are used instead of the electrode active material used therein, and there is no additional conductive material as used therein.

Dry Electrode

A dry electrode according to this disclosure includes the electrode mixture film or the electrode active material layer according to aspects of this disclosure described above. For example, the dry electrode may include a current collector, and the electrode mixture film or the electrode active material layer of this disclosure formed on the current collector.

The dry electrode according to this disclosure may be manufactured by stacking the electrode mixture film or the electrode active material layer on one side or both sides of the current collector and laminating the resulting product.

The lamination may be attaching the electrode mixture film or the electrode active material layer to the current collector through rolling. The lamination may be performed through a method of roll press using a lamination roller, and in this case, the lamination roller may be maintained at a temperature of 20° C. to 200° C.

When the dry electrode may be a positive electrode, the current collector is not particularly limited as long as it has conductivity without causing chemical changes in batteries. For example, stainless steel, aluminum, nickel, titanium, fired carbon, or aluminum or stainless steel that may be surface-treated with one of carbon, nickel, titanium, silver, or the like may be used as the collector.

When the dry electrode may be a negative electrode, the current collector is not particularly limited as long as it has a high conductivity without causing changes in batteries, and for example, copper, stainless steel, aluminum, nickel, titanium, fired carbon, copper or stainless steel which may be surface-treated with carbon, nickel, titanium, silver, or the like, an aluminum-cadmium alloy, or the like may be used.

The current collector may have a thickness of 3 μm to 100 μm, preferably 8 μm to 80 μm, but is not limited thereto. In addition, fine irregularities may be formed on a surface of the current collector to improve the adhesion of the mixture film.

The current collector may be entirely or partially coated with a conductive primer to lower surface resistance and improve adhesion. In this case, the conductive primer may include a conductive material and a binder, and the conductive material is not limited as long as the material may be conductive, but may be, for example, a carbon-based material. The binder may include a fluorine-based binder (including PVDF and PVDF copolymer), an acryl-based binder, and an aqueous binder, which are soluble in solvents.

Lithium Secondary Battery

A lithium secondary battery according to this disclosure includes a dry electrode as described above, wherein the dry electrode comprises the electrode mixture film or the electrode active material layer described herein on a current collector. For example, the lithium secondary battery may include a secondary battery comprising a liquid electrolyte or an all-solid-state battery comprising a solid electrolyte.

According to an aspect of this disclosure, when the lithium secondary battery is a secondary battery comprising a liquid electrolyte, the lithium secondary battery may comprise separators between the plurality of the electrodes. The separator may be to separate the negative electrode and the positive electrode and to provide a movement path for lithium ions, and any separator may be used without particular limitation as long as it may be typically used as a separator in a lithium secondary battery, and particularly, a separator having high moisture-retention ability for an electrolyte as well as low resistance to the movement of electrolyte ions may be preferable. Specifically, a porous polymer film, for example, a porous polymer film prepared using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. In addition, a typical porous non-woven fabric, for example, a non-woven fabric formed of glass fiber having a high melting point, polyethylene terephthalate fiber, or the like may be used. Furthermore, a coated separator including a ceramic component or a polymer material may be used to secure heat resistance or mechanical strength, and a separator having a single-layer structure or a multi-layer structure may be optionally used.

Also, when the lithium secondary battery is an all-solid-state battery, a solid electrolyte layer may be designed to perform the function of the separator.

In addition, the electrolyte used in this disclosure may be selected among an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacture of a lithium secondary battery, but is not limited thereto.

For example, the electrolyte may include an organic solvent and a lithium salt. Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable.

Any compound may be used as the lithium salt without particular limitation as long as it may provide lithium ions used in a lithium secondary battery. To be specific, an anion of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2^-$, $LiN(C_2F_5SO_3)_2$, $LiN(CF_3SO_2)_2$. $LiCl$, $LiI$, or $LiB(C_2O_4)_2$ may be used. The lithium salt may be used in a concentration range of 0.1 M to 4.0 M, preferably 0.5 M to 3.0 M, more preferably 1.0 M to 2.0 M. When the concentration of the lithium salt is in the above range, the electrolyte has suitable conductivity and viscosity, thereby exhibiting excellent performance, and lithium ions may effectively move.

In addition to the above-described electrolyte components, one or more types of additives such as a haloalkylene carbonate-based compound such as difluoroethylene carbonate, pyridine, triethylphosphite, triethanolamine, a cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, and aluminum trichloride may be further included in the electrolyte for the purpose of enhancing the lifetime characteristics of batteries, suppressing a reduction in battery capacity, enhancing the discharge capacity of batteries, and the like. In this case, the additive may be included in an amount of 0.1 wt % to 10.0 wt % with respect to a total weight of the electrolyte.

In addition, the lithium secondary battery according to this disclosure as describe above stably exhibits excellent discharging capacity, output properties, and capacity retention, and thus, are useful for portable devices such as a mobile phone, a notebook computer, and a digital camera, and in the field of electric cars such as a hybrid electric vehicle (HEV).

Accordingly, according to another aspect of this disclosure, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

EXAMPLE

Hereinafter, examples of the present disclosure will be described in detail in such a manner that it may easily be performed by a person skilled in the art to which the present disclosure pertains. The present disclosure may, however, be embodied in many different forms, and is not limited to Examples set forth herein.

Example 1

97 g of lithium iron phosphate (Changzhou Liyuan, LFP-S20) having a volume cumulative average particle diameter of 1.09 μm and a carbon coating layer thickness of 0.01 μm as a positive electrode active material and 3 g of polytetrafluoroethylene (PTFE) as a fiberized binder were put into a blender and mixed at 10,000 rpm for 1 minute to prepare a material mixture, and then the material mixture was put into a kneader and kneaded at a rotation speed of 50 rpm for 5 minutes at 1.1 atm and 150° C. to prepare a mixed aggregate, and the mixed aggregate was put into a blender, pulverized at 10,000 rpm for 40 seconds, and classified using a sieve having a pore size of 1 mm to prepare an electrode powder. Thereafter, the electrode powder was subjected to sheeting using a calendering roll (roll diameter: 88 mm, roll speed: 20 rpm, roll temperature: 100° C.) in a roll-to-roll process to prepare an electrode mixture film having a loading amount of 3.5 mAh/cm² and a porosity of 26.0 vol %.

Two sheets of the electrode mixture film were placed on both sides of aluminum foil (thickness: 15 μm) provided with a conductive primer layer and subjected to lamination through a roll press maintained at 150° C. to manufacture a dry electrode.

In this case, a degree of agglomeration of the binder measured through the same method as described below was 0.8.

Example 2

A dry electrode was manufactured in the same manner as in Example 1, except that the process was controlled such that the degree of agglomeration of the binder was 0.6 by setting the blender running time in the mixing process to 3 minutes and the kneader running time in the kneading process to 10 minutes.

Example 3

A dry electrode was manufactured in the same manner as in Example 1, except that the process was controlled such that the degree of agglomeration of the binder was 0.4 by setting the blender running time in the mixing process to 5 minutes and the kneader running time in the kneading process to 10 minutes.

Example 4

A dry electrode was manufactured in the same manner as in Example 2, except that 98 g of lithium iron phosphate having a volume cumulative average particle diameter of 1.09 μm and a carbon coating layer thickness of 0.01 μm was added as a positive electrode active material and 2 g of polytetrafluoroethylene was added.

Example 5

A dry electrode was manufactured in the same manner as in Example 2, except that 96 g of lithium iron phosphate having a volume cumulative average particle diameter of 1.09 μm and a carbon coating layer thickness of 0.01 μm was added as a positive electrode active material and 4 g of polytetrafluoroethylene was added.

Example 6

A dry electrode was manufactured in the same manner as in Example 2, except that 95 g of lithium iron phosphate having a volume cumulative average particle diameter of 1.09 μm and a carbon coating layer thickness of 0.01 μm was added as a positive electrode active material and 5 g of polytetrafluoroethylene was added.

Example 7

A dry electrode was manufactured in the same manner as in Example 2, except that lithium iron phosphate (Huayou, SF17) having a volume cumulative average particle diameter of 0.9 μm and a carbon coating layer thickness of 0.01 μm was added as a positive electrode active material.

Example 8

A dry electrode was manufactured in the same manner as in Example 7, except that 98 g of lithium iron phosphate and 2 g of polytetrafluoroethylene were added.

Comparative Example 1

A dry electrode was manufactured in the same manner as in Example 4, except that the process was controlled such that the degree of agglomeration of the binder was 0.9 by setting the blender running time in the mixing process to 1 minute and the kneader running time in the kneading process to 3 minutes.

Comparative Example 2

A dry electrode was manufactured in the same manner as in Example 1, except that the process was controlled such that the degree of agglomeration of the binder was 0.2 by setting the blender running time in the mixing process to 5 minutes and the kneader running time in the kneading process to 20 minutes.

Comparative Example 3

A dry electrode was manufactured in the same manner as in Example 1, except that the process was controlled such that the degree of agglomeration of the binder was 0.1 by setting the blender running time in the mixing process to 5 minutes and the kneader running time in the kneading process to 30 minutes.

Comparative Example 4

A dry electrode was manufactured in the same manner as in Example 2, except that 93 g of lithium iron phosphate having a volume cumulative average particle diameter of 1.09 μm and a carbon coating layer thickness of 0.01 μm was added as a positive electrode active material and 7 g of polytetrafluoroethylene was added.

Comparative Example 5

A dry electrode was manufactured in the same manner as in Example 2, except that lithium iron phosphate (ALEEES, M121) having a volume cumulative average particle diameter of 2.0 μm and a carbon coating layer thickness of 0.008 μm was added as a positive electrode active material.

Comparative Example 6

A dry electrode was manufactured in the same manner as in Example 2, except that lithium iron phosphate having a volume cumulative average particle diameter of 4.0 μm and a carbon coating layer thickness of 0.015 μm was added as a positive electrode active material.

Comparative Example 7

A dry electrode was manufactured in the same manner as in Example 2, except that 96 g of lithium iron phosphate having a volume cumulative average particle diameter of 1.09 μm and a carbon coating layer thickness of 0.01 μm was added as a positive electrode active material, 3 g of polytetrafluoroethylene was added, and 1 g of carbon Black (Denka, Li-400) was added.

Comparative Example 8

A dry electrode was manufactured in the same manner as in Example 2, except that 95 g of lithium iron phosphate having a volume cumulative average particle diameter of 1.09 μm and a carbon coating layer thickness of 0.01 μm was added as a positive electrode active material, 3 g of polytetrafluoroethylene was added, and 2 g of carbon Black (Denka, Li-400) was added.

Measurement of Degree of Agglomeration of Binder

A degree of agglomeration of the binders in Examples and Comparative Examples was derived as follows.

For a cross-section of an electrode mixture film, a target image having a resolution of 1280×960 was obtained through back scattered electron (BSE) measurement using field emission scanning electron microscope (FESEM, Hitachi, Su8020). Thereafter, a commercial image processing program, Mountains, was used to adjust a contrast level from the target image, where a contrast level for an active material region was adjusted to the highest contrast level and a contrast level of a binder region was adjusted to the lowest contrast level, which was then divided into and binder pixels and active material pixels for each pixel in the image. For the binder pixels, the number of agglomerated binder pixels was calculated in an agglomerated binder region having an area of 3 μm² or greater, which was a binder region formed by a plurality of adjacent binder pixels, and the total number of binder pixels in an entire binder region was calculated, to derive the degree of agglomeration $A_B$ of the binder using Equation 2 below.

[Equation 2]

$$A_B = \text{(number of agglomeration binder pixels)}/\text{(total number of binder pixels)}$$

[Porosity]

The porosity was calculated using Equation A below.

[Equation A]

$$\text{Porosity } (vol \ \%) = \{1 - (\text{electrode density}/\text{true density})\} \times 100$$

In Equation A above, the true density is density of an electrode mixture film measured when the electrode mixture film is taken to a predetermined size and pressed with press equipment until changes in thickness of the film stop, and the electrode density is density of an electrode mixture film measured when the film is taken to a predetermined size.

TABLE 1

|  | $A_B$ | R | $T_C/D_{AM}$ | CPCI |
|---|---|---|---|---|
| Example 1 | 0.8 | 32.3 | 0.0092 | 0.24 |
| Example 2 | 0.6 | 32.3 | 0.0092 | 0.18 |
| Example 3 | 0.4 | 32.3 | 0.0092 | 0.12 |
| Example 4 | 0.6 | 49.0 | 0.0092 | 0.27 |
| Example 5 | 0.6 | 24.0 | 0.0092 | 0.13 |
| Example 6 | 0.6 | 19.0 | 0.0092 | 0.10 |
| Example 7 | 0.6 | 32.3 | 0.0111 | 0.22 |
| Example 8 | 0.6 | 49.0 | 0.0111 | 0.33 |
| Comparative Example 1 | 0.9 | 49.0 | 0.0111 | 0.49 |
| Comparative Example 2 | 0.2 | 32.3 | 0.0092 | 0.06 |
| Comparative Example 3 | 0.1 | 32.3 | 0.0092 | 0.03 |
| Comparative Example 4 | 0.6 | 13.3 | 0.0092 | 0.07 |
| Comparative Example 5 | 0.6 | 32.3 | 0.0040 | 0.08 |
| Comparative Example 6 | 0.6 | 32.3 | 0.0038 | 0.07 |
| Comparative Example 7 | 0.6 | 96.0 | 0.0092 | 0.53 |
| Comparative Example 8 | 0.6 | 158.3 | 0.0092 | 0.87 |

Experimental Example 1: Evaluation of Dry Electrode

For the dry electrodes prepared in Examples and Comparative Examples above, physical properties were evaluated through the following method and are shown in Table 2 below.

1) Tensile strength (MPa): In Examples and Comparative Examples, prior to lamination with a current collector, a 50 mm (MD)×10 mm (TD) film was sampled, and the sample was measured using UTM equipment (ZwickRoell) in accordance with ASTM 638 under the conditions of a pre-load of 0.01 kgf/cm and a speed of 50 mm/min. A maximum value of the force applied before the breakage of the sample was obtained.

2) Powder resistance (Ωcm): 2.0 g of the electrode powder obtained from the manufacture of the dry electrode of Examples and Comparative Examples above was put into a cylindrical geometry, and then, using a powder resistance meter (HPRM-AM2-L from Hantech), surface resistance was measured at an increasing pressure in a pressure-measuring press and volume that decreases with the increase in pressure was also measured to determine powder resistance at a packing density of 2.3 g/cc.

3) Interfacial resistance (Ωcm²): The dry electrodes manufactured in Examples and Comparative Examples was cut into a size of 100 mm×100 mm, and a current of 100 uA was applied to the electrodes using a method of MP resistance measurement, and a resistance value between an electrode mixture film and a current collector layer was measured using potential difference measured between 46 probes.

TABLE 2

| | Powder resistance (Ωcm) | Tensile strength (MPa) | Interfacial resistance (Ωcm) |
|---|---|---|---|
| Example 1 | 15.0 | 0.44 | 0.0956 |
| Example 2 | 15.8 | 0.36 | 0.1050 |
| Example 3 | 16.8 | 0.30 | 0.0911 |
| Example 4 | 11.9 | 0.29 | 0.0825 |
| Example 5 | 13.1 | 0.66 | 0.1586 |
| Example 6 | 14.2 | 0.71 | 0.2114 |
| Example 7 | 16.2 | 0.48 | 0.1102 |
| Example 8 | 13.2 | 0.28 | 0.0899 |
| Comparative Example 1 | 11.5 | 0.12 | 0.0768 |
| Comparative Example 2 | 20.1 | 0.21 | 0.1255 |
| Comparative Example 3 | 22.5 | 0.18 | 0.1421 |
| Comparative Example 4 | 30.5 | 0.84 | 0.2944 |
| Comparative Example 5 | 178.8 | 0.58 | 1.0070 |
| Comparative Example 6 | 30.1 | 0.78 | 0.2852 |
| Comparative Example 7 | 8.1 | 0.37 | 0.0842 |
| Comparative Example 8 | 6.7 | 0.38 | 0.0410 |

Referring to Table 2 above, it is determined that in Examples 1 to 8 in which the degree of agglomeration of the binder based on the binder amount was well controlled, film forming was achieved without a significant degradation in the tensile strength of the film, and the interface resistance of an electrode was also at a satisfactory level despite no inclusion of a conductive material. However, it is determined that in Comparative Example 1 in which the CPCI value was not controlled, for example, in which the binder amount was low but the degree of agglomeration of the binder was greatly increased, exhibited no significant improvement in resistance along with too low tensile strength of a film compared to Examples, resulting in process defects and appearance defects during sheet forming, and Comparative Example 2, in which the degree of agglomeration of the binder was too low, exhibited poor mechanical properties, possibly causing the same issue.

Referring to the remaining Comparative Examples, it is seen that satisfying both mechanical properties and resistance properties requires a comprehensive control of factors related to the CPCI, rather than simply controlling the binder amount or the degree of agglomeration of the binder individually.

Experimental Example 2: Evaluation of Battery Performance

1) Manufacture of lithium secondary battery: Artificial graphite was used as a negative electrode active material. A negative electrode was prepared including a negative electrode active material layer containing the negative electrode active material, CMC and SBR as negative electrode binders, and carbon black as a negative electrode conductive material at a weight ratio of 96.7:2.8:0.5. The negative electrode active material layer had a weight loading of 277 mg/25 cm² and a thickness of 67 μm, and copper foil having a thickness of 10 μm was used as the negative electrode current collector.

The dry positive electrode of Examples and Comparative Examples, the negative electrode, and a porous polyethylene separator were assembled using a winding method, and an electrolyte (ethylene carbonate (EC)/ethyl methyl carbonate (EMC)=3/7 (volume ratio) and lithium hexafluorophosphate (1 mole of LiPF6) were injected into the assembled battery to prepare a lithium secondary battery.

The lithium secondary battery was charged up to 3.6 V at a C-rate of 0.1 C and then discharged up to 2.5 V to perform an activation process.

2) Cell resistance (mΩ): The lithium secondary battery was charged and discharged and then fully charged and discharged to measure pulse resistance (0.1 second resistance) by applying a 2.5 C pulse current for a certain period of time according to the SOC change.

3) Discharge capacity (mAh): The lithium secondary battery was charged up to 3.6 V at 0.2 C in CCCV mode (end current: 1/20 C), and then discharged up to 2.5 V at a constant current of 0.2 C to measure capacity as low rate discharge capacity, and discharged up to 2.5 V at a constant current of 2.0 C to measure capacity as high-rate discharge capacity, thereby obtaining a value for each, and a ratio of the high-rate discharge capacity to the low-rate discharge capacity was obtained.

TABLE 3

| | 0.1 second cell resistance (mohm) | Low rate discharge capacity (mAh) | High rate discharge capacity (mAh) | High rate/ Low rate (%) |
|---|---|---|---|---|
| Example 1 | 377.5 | 107.1 | 82.1 | 76.66 |
| Example 2 | 377.9 | 107.2 | 82.0 | 76.49 |
| Example 3 | 375.5 | 107.3 | 82.3 | 76.70 |
| Example 4 | 376.2 | 108.0 | 82.8 | 76.67 |
| Example 5 | 384.9 | 106.2 | 81.2 | 76.46 |
| Example 6 | 390.6 | 104.6 | 79.7 | 76.20 |
| Example 7 | 379.2 | 107.5 | 82.5 | 76.74 |
| Example 8 | 373.3 | 108.3 | 83.1 | 76.73 |
| Comparative Example 1 | 370.5 | 108.1 | 82.7 | 76.50 |
| Comparative Example 2 | 385.4 | 107.2 | 82.2 | 76.68 |
| Comparative Example 3 | 392.1 | 107.1 | 82.0 | 76.56 |

TABLE 3-continued

| | 0.1 second cell resistance (mohm) | Low rate discharge capacity (mAh) | High rate discharge capacity (mAh) | High rate/ Low rate (%) |
|---|---|---|---|---|
| Comparative Example 4 | 415.2 | 102.5 | 77.9 | 76.00 |
| Comparative Example 5 | 450.7 | 106.3 | 81.0 | 76.20 |
| Comparative Example 6 | 406.8 | 108.9 | 82.6 | 75.85 |
| Comparative Example 7 | 359.8 | 105.9 | 79.5 | 75.07 |
| Comparative Example 8 | 327.0 | 104.8 | 79.6 | 75.95 |

Referring to Table 3 above, it is determined that Examples 1 to 8 included no conductive material, and thus exhibited significantly improved processability by eliminating a distribution process, and also exhibited both cell resistance and discharge capacity at a satisfactory level compared to Comparative Examples.

In addition, it is determined that even without the inclusion of a conductive agent, in Examples 1 to 8, a ratio of high rate discharge capacity to low rate discharge capacity was not low, indicating satisfactory output performance. This indicates that, although Comparative Examples 7 and 8 included conductive materials, discharge capacity ratios thereof were lower than those of Examples, resulting in superior cell resistance characteristics but inferior performance in output based on overall battery resistance properties.

In particular, in Examples 1 to 3 and 7 and Comparative Examples 3, 5, and 6, which have the same active material amount of 97 parts by weight, it is seen that the capacity characteristics and output are similar, but the cell resistance is inferior, indicating poor lithium ion mobility. This suggests that there will be a difference in quick charging performance in the end.

In addition, in Example 5 and Comparative Example 7, both having an active material amount of 96 parts by weight, it is determined that while there is a difference in cell resistance, capacity characteristics are superior, and in terms of electrode performance, the tensile The strength of a film is approximately half that of the other, which may harm sheet forming processes, and the composition also has a significantly higher defect rate. It is seen that the same trend is observed when comparing Example 6 and Comparative Example 8, both of which have an active material amount of 95 parts by weight.

That is, it is determined that when the CPCI according to an aspect of the present disclosure is not satisfied, the tensile strength of the film is poor and thus sheet forming is not normally performed, or even if normal electrode fabrication is allowed, the cell resistance is high or at least any one of the capacity characteristics or output characteristics is poor, and when the CPCI value is satisfied, processability in the manufacturing process, and capacity and output characteristics may be secured with no use of a conductive material and no degradation of cell resistance.

The invention claimed is:

1. A cathode active material layer for a battery, the cathode active material layer comprising:
   conductive active material particles individually with a core and a coating on a surface of the core, wherein the core comprises a cathode active material, and the coating comprises an electrically conductive material; and a binder comprising fibers that are generally linear, extend in random orientations, curve or bend randomly, and intersect and connect with one another at random locations, which provides a three-dimensionally networked mesh of fibers (hereinafter "3D mesh") comprising a number of mesh openings in random shapes, wherein the cathode active material layer is free or substantially free of electrically conductive particles other than the conductive active material particles, wherein the conductive active material particles are accommodated in the 3D mesh of the binder, and adjacent ones of the conductive active material particles abut one another within the 3D mesh, in which the electrically conductive material of the coating of one of the conductive active material particles makes at least one contact with the electrically conductive material of the coating of one or more adjacent ones of the conductive active material particles, such that first multiple ones of the fibers ("first multiple fibers") contact a first one of the conductive active material particles ("a first particle") and extend in random orientations on and/or over circumferential areas of the first particle, in which at least some of the first multiple fibers intersect and connect with one another on and/or over some of the circumferential areas of the first particle to form a plurality of mesh openings comprising a first mesh opening that defines a first circumferential area of the first particle, such that second multiple ones of the fibers ("second multiple fibers") contact a second one of the conductive active material particles ("a second particle") and extend in random orientations on and/or over circumferential areas of the second particle that is adjacent to the first particle, in which some of the second multiple fibers intersect and connect with one another on and/or over some of the circumferential areas of the second particle to form a plurality of mesh openings comprising a second mesh opening that defines a second circumferential area of the second particle, such that third multiple ones of the fibers ("third multiple fibers") contact a third one of the conductive active material particles ("a third particle") and extend in random orientations on and/or over circumferential areas of the third particle that is adjacent to the second particle, in which some of the third multiple fibers intersect and connect with one another on and/or over some of the circumferential areas of the third particle to form a plurality of mesh openings comprising a third mesh opening that defines a third circumferential area of the third particle, such that the first particle abuts the second particle in that the first circumferential area of the first particle (directly) contacts the second circumferential area of the second particle without electrically conductive particles intervening therebetween, which provides electrical conductivity between the first particle and the second particle, such that the second particle abuts the third particle in that the second circumferential area of the second particle contacts the third circumferential area of the third particle without electrically conductive particles intervening therebetween, which provides electrical conductivity between the second particle and the third particle, such that the first particle does not abut or contact the third particle, wherein, while being free or substantially free of electrically conductive particles, the cathode active material layer has electrical conductivity with a surface resistance in a range from about 0.01 $\Omega \cdot cm^2$ to about 100 $\Omega \cdot cm^2$ via contacts made between adjacent ones of the conductive active material particles accommodated in the 3D mesh.

2. The cathode active material layer of claim 1, wherein fourth multiple ones of the fibers ("fourth multiple fibers") contact a fourth one of the conductive active material particles ("a fourth particle") and extend in random orientations on and/or over circumferential areas of the fourth particle that is adjacent to the third particle, in which some of the fourth multiple fibers intersect and connect with one another on and/or over some of the circumferential areas of the fourth particle to form a plurality of mesh openings comprising a fourth mesh opening that defines a fourth circumferential area of the fourth particle; and wherein the third particle abuts the fourth particle in that the third circumferential area of the third particle contacts the fourth circumferential area of the fourth particle without electrically conductive particles intervening therebetween, which provides electrical conductivity between the third particle and the fourth particle.

3. The cathode active material layer of claim 2, wherein the first particle does not abut or contact the fourth particle.

4. The cathode active material layer of claim 3, wherein fifth multiple ones of the fibers ("fifth multiple fibers") may contact a fifth one of the conductive active material particles ("a fifth particle") and extend in random orientations on and/or over circumferential areas of the fifth particle that is adjacent to the fourth particle, in which some of the fifth multiple fibers intersect and connect with one another on and/or over some of the circumferential areas of the fifth particle to form a plurality of mesh openings comprising a fifth mesh opening that defines a fifth circumferential area of the fifth particle; and wherein the fifth particle abuts the sixth particle in that the fifth circumferential area of the fifth particle contacts the sixth circumferential area of the sixth particle without electrically conductive particles intervening therebetween, which provides electrical conductivity between the fifth particle and the sixth particle.

5. The cathode active material layer of claim 4, wherein the first particle does not abut or contact the fifth particle.

6. The cathode active material layer of claim 5, wherein the second particle does not abut or contact the fourth or fifth particle.

7. The cathode active material layer of claim 6, wherein the first, second, third, fourth, and fifth particles form a path that extends through the 3D mesh in all three spatial dimensions.

8. The cathode active material layer of claim 1, wherein the conductive active material particles comprise one particle that does not contact any fiber.

9. The cathode active material layer of claim 1, wherein the conductive active material particles comprise one particle that contacts multiple fibers, such that the multiple fibers extend in random orientations on and/or over circumferential areas of the particle and do not intersect and connect with one another to form any mesh opening on or over a circumferential area of the particle.

10. A method for preparing the cathode active material layer of claim 1, the method comprising:

mixing the conductive active material particles and the binder to form a material mixture, kneading the material mixture while applying shear force to form a mixed aggregate, pulverizing the mixed aggregate to prepare mixed powder, and sheeting the mixed powder to prepare the cathode active material layer.

11. A dry electrode comprising a current collector and the cathode active material layer of claim 1 disposed on the current collector.

12. A lithium secondary battery comprising a plurality of electrodes and separators alternately stacked, wherein at least one of the electrodes comprises the dry electrode of claim 11.

\* \* \* \* \*